US012784639B2

(12) United States Patent
Lin et al.

(10) Patent No.: US 12,784,639 B2
(45) Date of Patent: Nov. 3, 2026

(54) DISPLAY DRIVER CIRCUIT FOR DRIVING DISPLAY PANEL WITH OFFSET CANCELATION

(71) Applicant: NOVATEK Microelectronics Corp., Hsin-Chu (TW)

(72) Inventors: Wei-Chieh Lin, Hsinchu County (TW); Chi-Yi Lo, Kaohsiung City (TW); Yu-Huang Chen, Tainan City (TW)

(73) Assignee: NOVATEK Microelectronics Corp., Hsin-Chu (TW)

(*) Notice: Subject to any disclaimer, the term of this patent is extended or adjusted under 35 U.S.C. 154(b) by 0 days.

(21) Appl. No.: 19/063,201

(22) Filed: Feb. 25, 2025

(65) Prior Publication Data

US 2026/0253526 A1 Aug. 27, 2026

(51) Int. Cl.
*G09G 3/20* (2006.01)

(52) U.S. Cl.
CPC ... *G09G 3/2092* (2013.01); *G09G 2310/0267* (2013.01); *G09G 2310/027* (2013.01); *G09G 2310/0291* (2013.01); *G09G 2310/0297* (2013.01)

(58) Field of Classification Search
CPC ......... G09G 3/2092; G09G 2310/0267; G09G 2310/027; G09G 2310/0291; G09G 2310/0297
See application file for complete search history.

(56) References Cited

U.S. PATENT DOCUMENTS

| | | | | |
|---|---|---|---|---|
| 10,991,290 | B1 * | 4/2021 | Yang | G09G 3/20 |
| 11,631,373 | B1 * | 4/2023 | Chen | G09G 3/3291 345/204 |
| 11,842,693 | B2 * | 12/2023 | Kim | G09G 3/3241 |
| 2006/0227628 | A1 * | 10/2006 | Eriguchi | G09G 3/3688 365/189.07 |
| 2017/0213522 | A1 | 7/2017 | Xie | |
| 2019/0005889 | A1 * | 1/2019 | Kwon | G09G 3/30 |
| 2024/0420612 | A1 * | 12/2024 | Liao | G09G 3/2011 |

FOREIGN PATENT DOCUMENTS

| | | |
|---|---|---|
| CN | 104766564 | 7/2015 |
| CN | 111524487 | 8/2020 |
| TW | 201933327 | 8/2019 |

* cited by examiner

*Primary Examiner* — Kenneth B Lee, Jr.
(74) *Attorney, Agent, or Firm* — Winston Hsu

(57) ABSTRACT

A display driver circuit for controlling a display panel includes a first operational amplifier, a second operational amplifier and a first output switching circuit. The first output switching circuit is coupled to the first operational amplifier and the second operational amplifier. The first output switching circuit couples the first operational amplifier to a first data line of the display panel in a first scan period, to control the first operational amplifier to drive a first subpixel having a first color through the first data line. The first output switching circuit couples the first operational amplifier to a second data line of the display panel in a second scan period, to control the first operational amplifier to drive a second subpixel having the first color through the second data line.

21 Claims, 17 Drawing Sheets

DISPLAY DRIVER CIRCUIT FOR DRIVING DISPLAY PANEL WITH OFFSET CANCELATION

BACKGROUND OF THE INVENTION

1. Field of the Invention

The present invention relates to a display driver circuit, and more particularly, to a display driver circuit for driving a display panel with the chopper technique.

2. Description of the Prior Art

A display panel is generally driven by a source driver which may be implemented as a display driver integrated circuit (DDIC), which includes a great number of source operational amplifiers (SOPs) for outputting display data to drive the display panel. In general, these SOPs have voltage offsets due to mismatch of manufacturing process, and the polarities and/or magnitudes of the voltage offsets of different SOPs may be different. Excessively large voltage offsets would cause unwanted lines appearing on the display panel, thereby degrading the visual effect.

In order to solve the visual effect problems resulting from the voltage offsets, a chopper technique may be applied. Note that the voltage offset of an SOP refers to a voltage error between two input terminals of the SOP. Based on the chopper technique, the operations of the two input terminals of the SOP would be continuously swapped to cancel the voltage offset. Common chopper techniques include row chopper, column chopper and frame chopper. The row chopper and column chopper are spatial chopper techniques where different chopper polarities are applied to drive neighboring subpixels. The frame chopper is a temporal chopper technique where different chopper polarities are applied to drive adjacent image frames.

In recent years, with the development of the low-temperature polycrystalline oxide (LTPO) technology, several display panels may be driven with an extremely low frame rate to save power consumption. If the frame rate is decreased to an extremely low level such as 1 Hz, the display image is updated once every 1 second, causing that the effect of the frame chopper is limited. As mentioned above, the frame chopper applies different chopper polarities to two adjacent image frames. If the display panel is refreshed rapidly, the image difference caused by the chopper polarities may be averaged out visually. However, under the extremely low frame rate, since the display panel is refreshed or updated slowly, the image difference between different chopper polarities is easily observed by the user to cause visual effect problems. In such a situation, under the application of the extremely low frame rate, it is requested to prevent the usage of the frame chopper, while improving the performance of the row chopper and/or column chopper.

SUMMARY OF THE INVENTION

It is therefore an objective of the present invention to provide a display driver circuit which applies a novel switching scheme along with the column chopper to drive a display panel, in order to solve the abovementioned problems.

An embodiment of the present invention discloses a display driver circuit for controlling a display panel. The display driver circuit comprises a first operational amplifier, a second operational amplifier and a first output switching circuit. The first output switching circuit is coupled to the first operational amplifier and the second operational amplifier. The first output switching circuit couples the first operational amplifier to a first data line of the display panel in a first scan period, to control the first operational amplifier to drive a first subpixel having a first color through the first data line. The first output switching circuit couples the first operational amplifier to a second data line of the display panel in a second scan period, to control the first operational amplifier to drive a second subpixel having the first color through the second data line.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
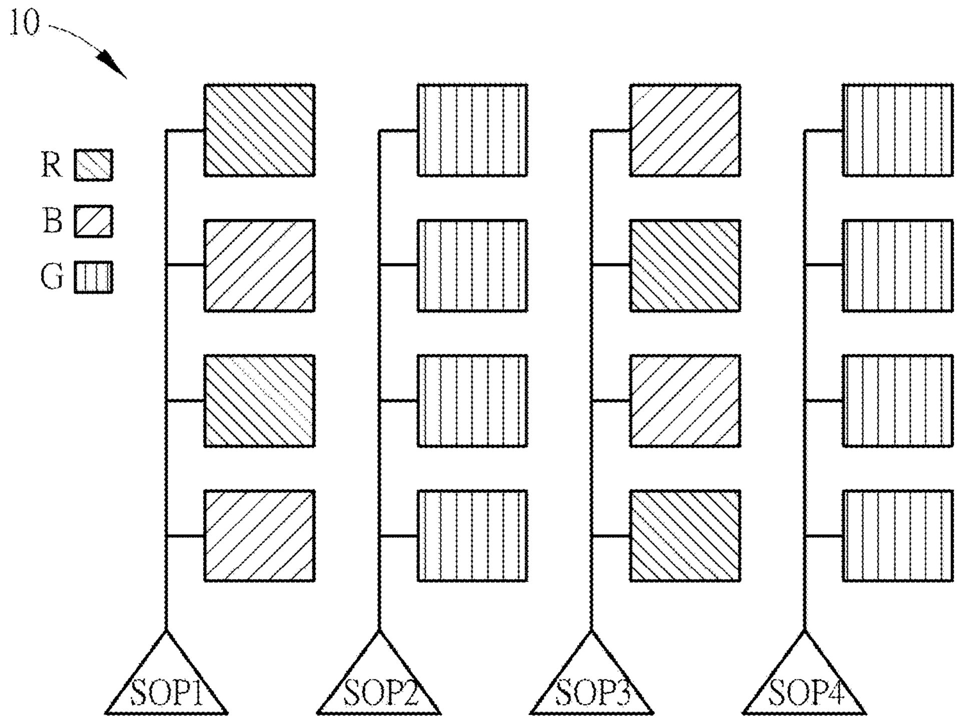
FIGS. 1-3 are schematic diagrams of display systems.

FIG. 1 is a schematic diagram of a display system 10. The display system 10 includes a display panel, in which a subpixel array is driven by multiple source operational amplifiers (SOPs) SOP1-SOP4. In order to realize a high resolution application, the subpixel rendering (SPR) technique is applied, where each pixel only includes two subpixels with two different colors, and the lacking color may be borrowed from neighboring pixels. FIG. 1 illustrates an exemplary implementation of subpixel arrangement with SPR, where several pixels include red (denoted by R) and green (denoted by G) subpixels, and other pixels include blue (denoted by B) and green subpixels.

In general, the SOPs SOP1-SOP4 may be included in a display driver circuit such as a source driver and/or a display driver integrated circuit (DDIC), which may be implemented in a chip and deployed below the display panel. Therefore, each SOP SOP1-SOP4 is configured to drive a column of subpixels. Note that FIG. 1 only shows a simplified structure for brevity, where four columns and four rows of subpixels are shown to illustrate the subpixel deployment with SPR and the deployment of the corresponding SOPs SOP1-SOP4. In fact, the display panel may include a subpixel array having hundreds or thousands of rows and hundreds or thousands of columns of subpixels, which may be controlled by several hundreds or thousands of SOPs. Other components of the display driver circuit are also omitted in FIG. 1 for brevity.

The structure shown in FIG. 1 is a general MUX 1:1 architecture, where each SOP SOP1-SOP4 is configured to drive one corresponding column of subpixels. In other embodiments, an SOP may be configured to drive multiple columns of subpixels through the control of multiplexers (MUXs).

Figure 2:
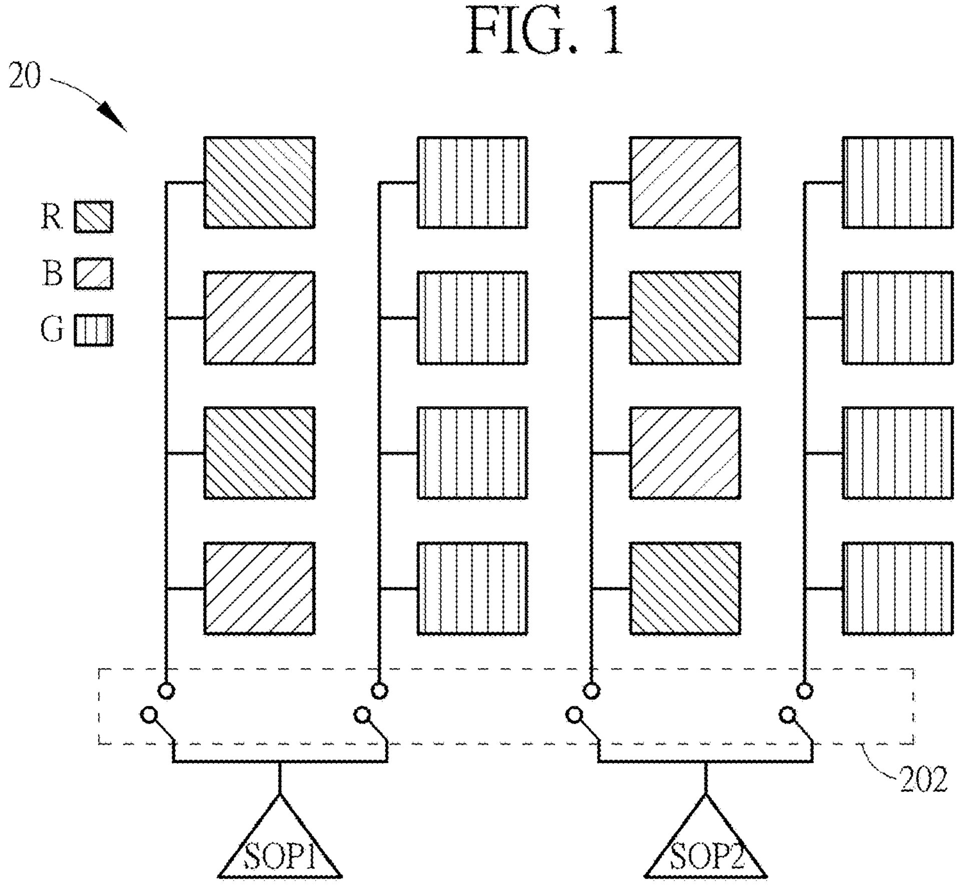

For example, FIG. 2 is a schematic diagram of another display system 20, which includes a subpixel array controlled by SOPs SOP1-SOP2 and a MUX 202. FIG. 2 illustrates a MUX 1:2 architecture with single data line (SDL) panel structure. Through the MUX 202, each of the SOPs SOP1 and SOP2 may be coupled to two data lines time-divisionally, to drive two columns of subpixels.

Figure 3:
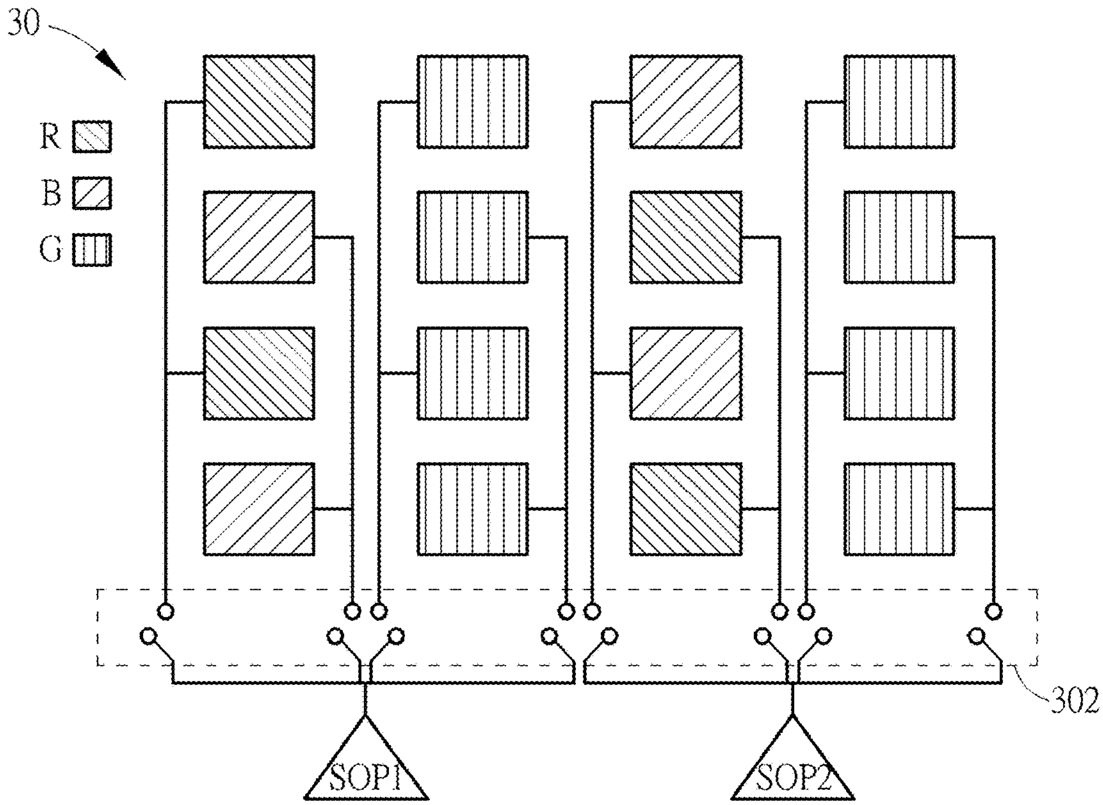

FIG. 3 illustrates a MUX 1:4 architecture with dual data line (DDL) panel structure. In the display system 30 shown in FIG. 3, the SOPs SOP1 and SOP2 may drive the subpixel array through the MUX 302. The DDL panel structure means that each column of subpixels is driven through two data lines, where the subpixels in odd rows are coupled to a data line and the subpixels in even rows are coupled to another data line. Similarly, through the MUX 302, each of the SOPs SOP1 and SOP2 may be coupled to four data lines time-divisionally, to drive two columns of subpixels.

Figure 4:
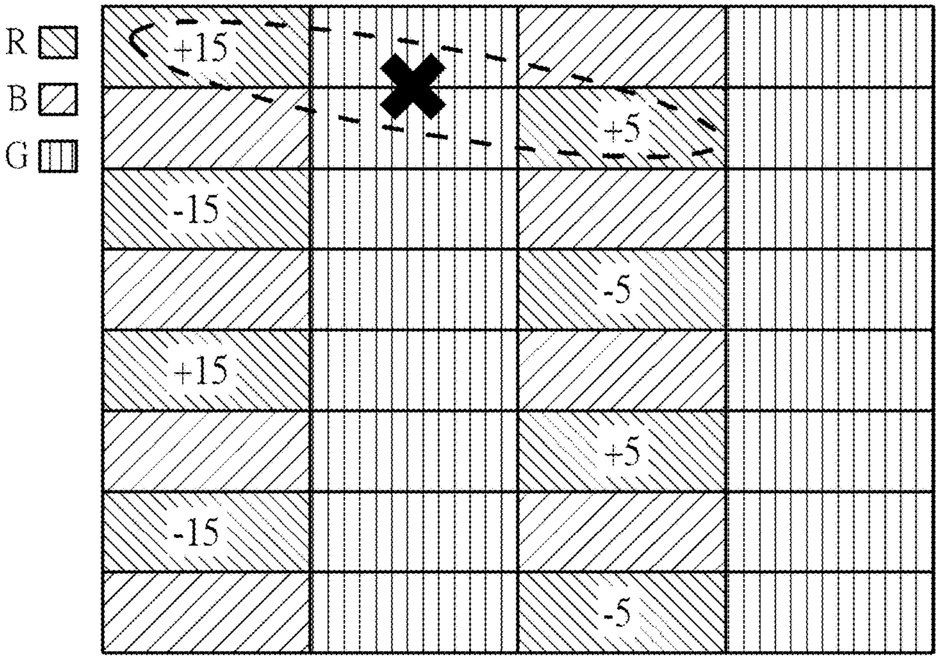
FIG. 4 illustrates that the red subpixels located in different columns are driven by SOPs having different voltage offsets.

In the panel structures shown in FIGS. 1-3, the same column of subpixels is driven by the same SOP, and different columns of subpixels are usually driven by different SOPs. As mentioned above, different SOPs may have different magnitudes of voltage offsets; hence, the column chopper effect for canceling the image difference resulting from the voltage offsets would not be satisfactory. For example, as shown in FIG. 4, there are four columns of subpixels under SPR arrangement, and each column is driven by one SOP (e.g., one of the SOPs SOP1-SOP4 in FIGS. 1-3), respectively. Assume that the SOP for driving the first column has a voltage offset equal to 15 millivolts (mV), and that the SOP for driving the third column has a voltage offset equal to 5 mV. As for the red subpixels, the voltage offset in horizontal direction may generate different magnitudes of image difference that may not be effectively canceled through the column chopper, which means that the image difference in horizontal direction cannot be averaged out visually, thereby generating unwanted lines on the display image. The blue subpixels also possess the same problem.

In order to solve the abovementioned problems, the present invention provides a novel driving scheme for driving the subpixels on the display panel, allowing the subpixels having the same color located in different columns to be driven by the same SOP. Through driving of the same SOP, the polarity and magnitude of the voltage offset corresponding to the same color would be identical. Therefore, the column chopper may be more effective.

Figure 5:
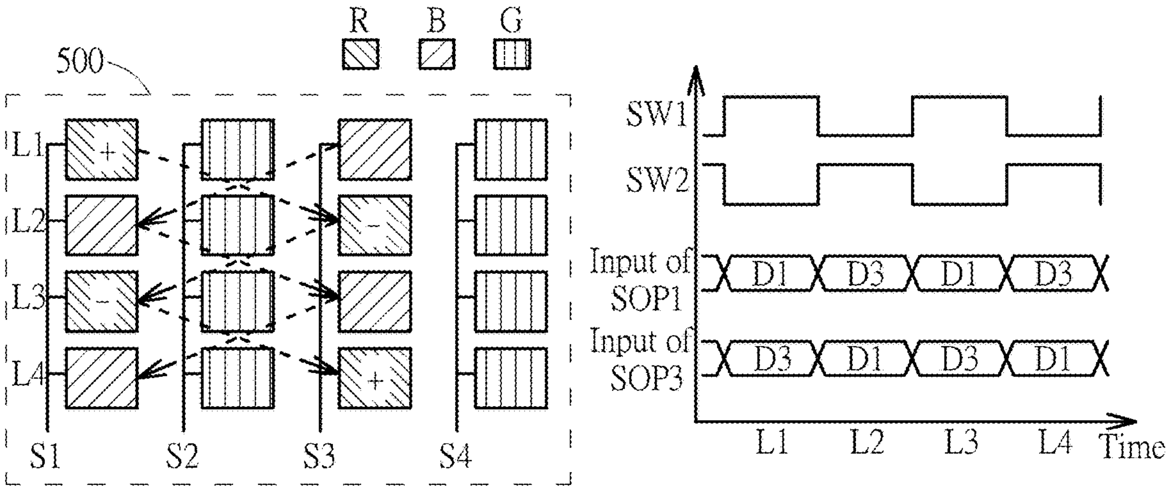
FIG. 5 is a schematic diagram of a display system according to an embodiment of the present invention.
Figure 5:
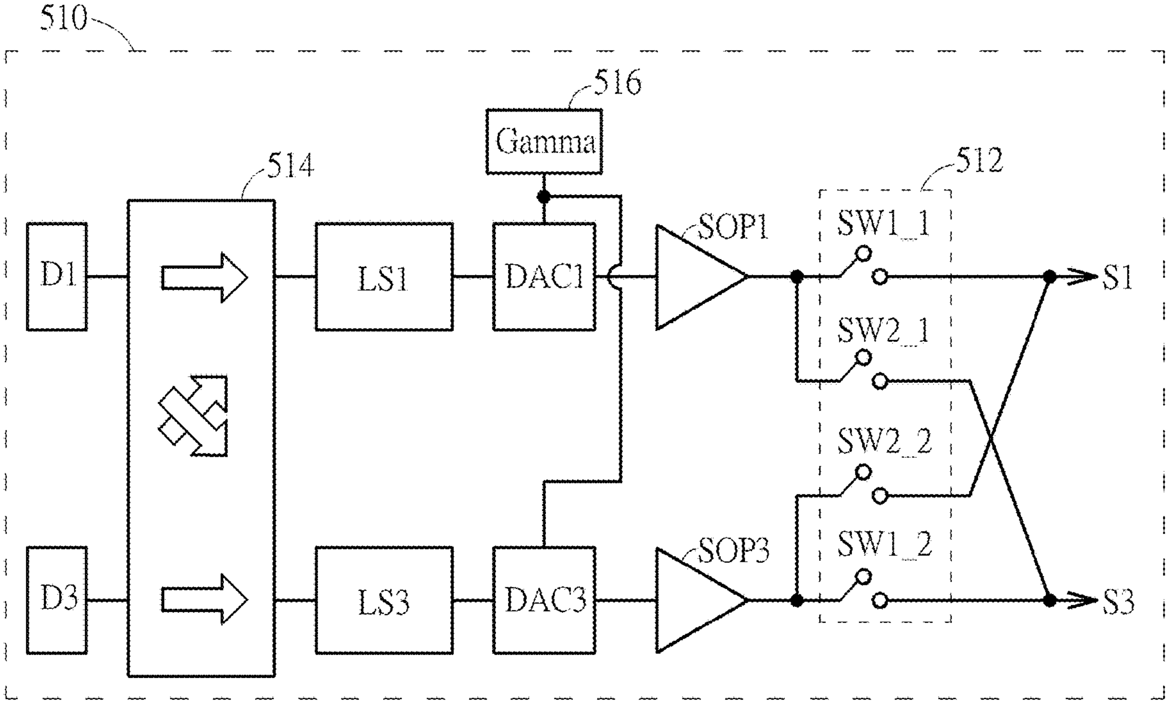

FIG. 5 is a schematic diagram of a display system according to an embodiment of the present invention. The display system includes a display panel 500 and a display driver circuit 510 for driving the display panel 500. The display panel 500 may be any type of display device, which may include, but not be limited to, a liquid crystal display (LCD) panel, light emitting diode (LED) panel, and organic LED (OLED) panel. The display driver circuit 510 may be a source driver implemented in a DDIC, but not limited thereto.

The display panel 500 includes a subpixel array, where each column of subpixels is coupled to a data line S1-S4, and each row of subpixels is located in a horizontal line L1-L4. Based on the SPR technique, the subpixels are arranged in an order of RG-BG or BG-RG. In other words, each pixel includes two subpixels, and the lacking red or blue color is borrowed from neighboring pixels. Under this subpixel arrangement, a column of subpixels may have red and blue subpixels deployed alternately (such as the column coupled to the data line S1 or S3) or may have all green subpixels (such as the column coupled to the data line S2 or S4).

The display driver circuit 510 may include a plurality of driving channels, each for driving one or more columns of subpixels on the display panel 500. FIG. 5 illustrates two driving channels for driving the data lines S1 and S3 as an example. Note that similar implementation of the driving channels is also applicable to the data lines S2 and S4. In addition, if there are hundreds of columns of subpixels on a display panel, the corresponding display driver circuit may include hundreds of corresponding driving channels implemented in the same manner.

In an embodiment, the display driver circuit 510 may drive the display panel 500 in an up-down manner. In other words, the subpixel array may be scanned row by row with a sequence of L1, L2, L3, L4 . . . , allowing the display driver circuit 510 to output display data to each row of subpixels sequentially.

As shown in FIG. 5, in the display driver circuit 510, each driving channel may include a level shifter (LS1, LS3), a digital-to-analog converter (DAC) (DAC1, DAC3), and an SOP (SOP1, SOP3). The first driving channel (i.e., the upper driving channel) may receive the display data D1 for the first column of subpixels coupled to the data line S1, and the second driving channel (i.e., the lower driving channel) may receive the display data D3 for the third column of subpixels coupled to the data line S3. An output switching circuit 512, which may be included in or coupled between two driving channels, is coupled to the output terminals of the SOPs SOP1 and SOP3. More specifically, the output switching circuit 512 is coupled between the SOPs SOP1 and SOP3 and the data lines S1 and S3, to control each of the SOPs SOP1 and SOP3 to be coupled to the data lines S1 and S3 alternately, allowing the SOPs SOP1 and SOP3 to drive the subpixels having the same color.

In this embodiment, the SOP SOP1 is configured to drive the red subpixels. Therefore, the output switching circuit 512 may couple the SOP SOP1 to the data line S1 in the scan periods for driving the horizontal lines L1 and L3, to control the SOP SOP1 to drive the red subpixels in the first column through the data line S1. In addition, the output switching circuit 512 may be switched to couple the SOP SOP1 to the data line S3 in the scan periods for driving the horizontal lines L2 and L4, to control the SOP SOP1 to drive the red subpixels in the third column through the data line S3. A scan period refers to a period in which one of the horizontal lines L1-L4 is scanned, i.e., a row of subpixels are driven to receive data voltages from the corresponding SOPs.

In a similar manner, the SOP SOP3 is configured to drive the blue subpixels. Therefore, the output switching circuit 512 may couple the SOP SOP3 to the data line S3 in the scan periods for driving the horizontal lines L1 and L3, to control the SOP SOP3 to drive the blue subpixels in the third column through the data line S3. In addition, the output switching circuit 512 may be switched to couple the SOP SOP3 to the data line S1 in the scan periods for driving the horizontal lines L2 and L4, to control the SOP SOP3 to drive the blue subpixels in the first column through the data line S1.

In such a situation, through continuous swapping performed by the output switching circuit 512, all red subpixels located in the first column and the third column are driven by the same SOP SOP1, and all blue subpixels located in the first column and the third column are driven by the same SOP SOP3. Since the same SOP has the same voltage offset, the image difference caused by the voltage offset may be perfectly averaged out for both red and blue subpixels under the chopper operation.

Figure 6:
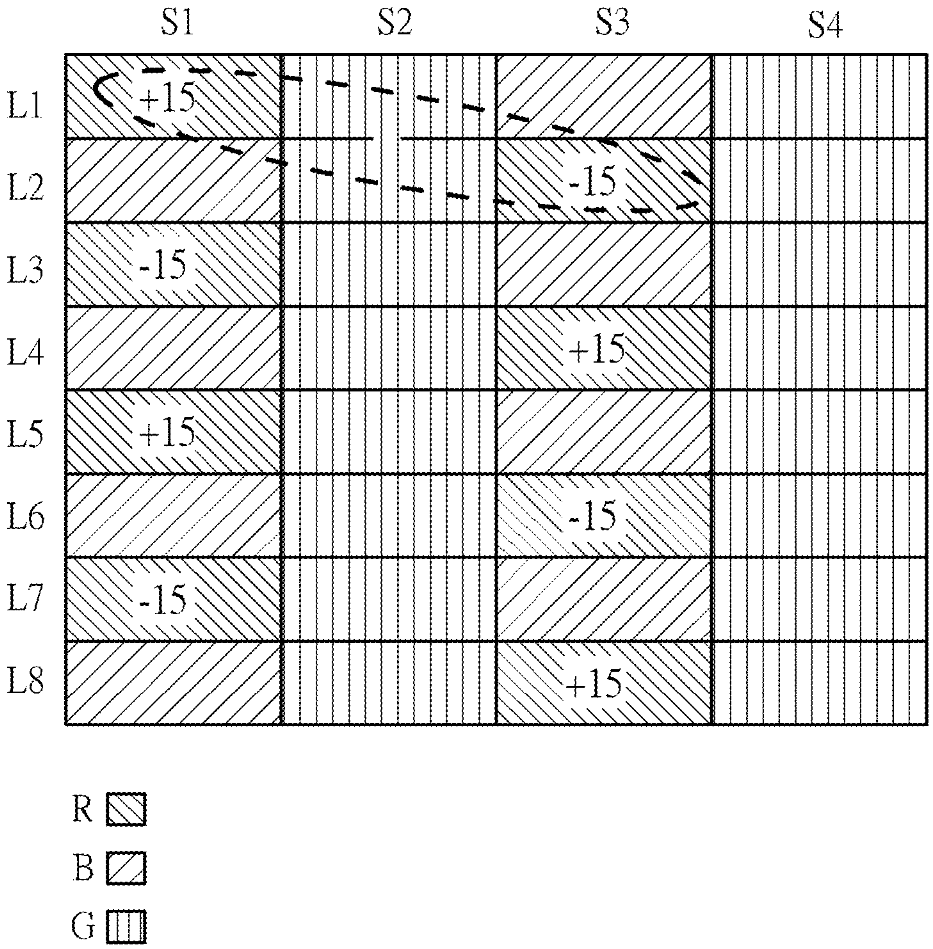
FIG. 6 illustrates that the red subpixels located in different columns are driven by the same SOP.

Taking the red subpixels as an example, as shown in FIG. 6, assuming that the SOP SOP1 for driving the red subpixels has a voltage offset equal to 15 mV, the data voltages received by the red subpixels in the first and third columns may have a +15 mV or −15 mV offset, depending on the chopper configuration. Through the column chopper operation, the SOP SOP1 may drive the red subpixel located in the first column in the horizontal line L1 in a positive chopper configuration, and then drive the red subpixel located in the third column in the horizontal line L2 in a negative chopper configuration. Through the row chopper operation, the SOP SOP1 may also apply different chopper configurations to the red subpixels located in the same column in different horizontal lines. The image difference accompanied by the 15 mV offset may be perfectly averaged out in visual effects, thereby achieving a better chopper effect.

Note that the output switching circuit 512 may switch the outputs of the SOPs SOP1 and SOP3 in any appropriate manner. For example, as shown in FIG. 5, the output switching circuit 512 may include four switches SW1_1, SW1_2, SW2_1 and SW2_2 coupled between the SOPs SOP1 and SOP3 and two output terminals of the display driver circuit 510. In various embodiments, the output terminals of the display driver circuit 510 may be output pads of a DDIC, to be coupled to the data lines S1 and S3 of the display panel 500. More specifically, the switch SW1_1 is coupled between the SOP SOP1 and a first output terminal (which is to be coupled to the data line S1), the switch SW2_1 is coupled between the SOP SOP1 and a second output terminal (which is to be coupled to the data line S3), the switch SW2_2 is coupled between the SOP SOP3 and the first output terminal, and the switch SW1_2 is coupled between the SOP SOP3 and the second output terminal.

The switches SW1_1 and SW1_2 may be controlled by a control signal SW1, and the switches SW2_1 and SW2_2 may be controlled by a control signal SW2. FIG. 5 also illustrates the waveforms of the control signals SW1 and SW2. In this embodiment, the control signal SW1 or SW2 in "High" level may turn on the corresponding switches, and in "Low" level may turn off the corresponding switches. In the scan periods for driving the horizontal lines L1 and L3, the switches SW1_1 and SW1_2 are turned on by the control signal SW1, to couple the SOP SOP1 to the data line S1 and couple the SOP SOP3 to the data line S3, while the switches SW2_1 and SW2_2 are turned off; hence, the SOP SOP1 may drive the red subpixels located in the first column and the SOP SOP3 may drive the blue subpixels located in the third column. In the scan periods for driving the horizontal lines L2 and L4, the switches SW2_1 and SW2_2 are turned on by the control signal SW2, to couple the SOP SOP1 to the data line S3 and couple the SOP SOP3 to the data line S1, while the switches SW1_1 and SW1_2 are turned off; hence, the SOP SOP1 may drive the red subpixels located in the third column and the SOP SOP3 may drive the blue subpixels located in the first column.

Note that the display data D1 for the first column of subpixels and the display data D3 for the third column of subpixels are provided to the two driving channels of the display driver circuit 510, respectively. Since the output switching circuit 512 may switch the outputs of the SOPs SOP1 and SOP3 to the data lines S1 and S3 alternately, in order to control the display data D1 and D3 to be output to the target subpixels, a data arrangement circuit 514 should be included to adjust the forwarding path of the display data D1 and D3. As shown in FIG. 5, the data arrangement circuit 514 may be deployed between input terminals of the display driver circuit 510 and the level shifters LS1 and LS3, where the input terminals are configured to receive the display data D1 and D3. In several embodiments, the data arrangement circuit 514 may be integrated with the data latches for storing the display data D1 and D3.

In the scan periods where the SOP SOP1 is coupled to the data line S1 and the SOP SOP3 is coupled to the data line S3 (i.e., the scan periods for the horizontal lines L1 and L3), the data arrangement circuit 514 may couple a first input terminal (which receives the display data D1) to the first driving channel and the SOP SOP1, and couple a second input terminal (which receives the display data D3) to the second driving channel and the SOP SOP3, allowing the display data D1 to be forwarded to the data line S1 and the display data D3 to be forwarded to the data line S3. In the scan periods where the SOP SOP1 is coupled to the data line S3 and the SOP SOP3 is coupled to the data line S1 (i.e., the scan periods for the horizontal lines L2 and L4), the data arrangement circuit 514 may couple the first input terminal to the second driving channel and the SOP SOP3, and couple the second input terminal to the first driving channel and the SOP SOP1, allowing the display data D1 to be forwarded to the data line S1 and the display data D3 to be forwarded to the data line S3.

FIG. 5 further illustrates that the display driver circuit 510 includes a gamma circuit 516, which is coupled to each DAC DAC1 and DAC3. The gamma circuit 516 may provide gamma voltages to be selected by the DACs DAC1 and DAC3 based on the display data D1 and D3. In this embodiment, the display driver circuit 510 has a 1-gamma structure, where different DACs DAC1 and DAC3 are coupled to the same gamma circuit 516 and select gamma voltages from the gamma circuit 516 irrespective of the color of the display data. In another embodiment, a display driver circuit may be provided with a 3-gamma structure to have three gamma circuits corresponding to three different colors. More specifically, the display driver circuit may include an R-gamma circuit, a G-gamma circuit, and a B-gamma circuit for the colors RGB, respectively. Based on the color of the target subpixel of the display data, the DAC may select the gamma voltage from the corresponding gamma circuit. In such a situation, if an SOP is configured to always drive subpixels having the same color, the corresponding DAC may be always coupled to the gamma circuit corresponding to this color. For example, if an SOP is used for driving the red subpixels, the DAC in the same channel may be fixed to the R-gamma circuit; if an SOP is used for driving the blue subpixels, the DAC in the same channel may be fixed to the B-gamma circuit.

Note that the embodiment in FIG. 5 shows that the gamma circuit 516 is included in the display driver circuit 510. In another embodiment, the gamma circuit (s) may be one or more circuit devices coupled to the display driver circuit or the source driver.

Figure 7:
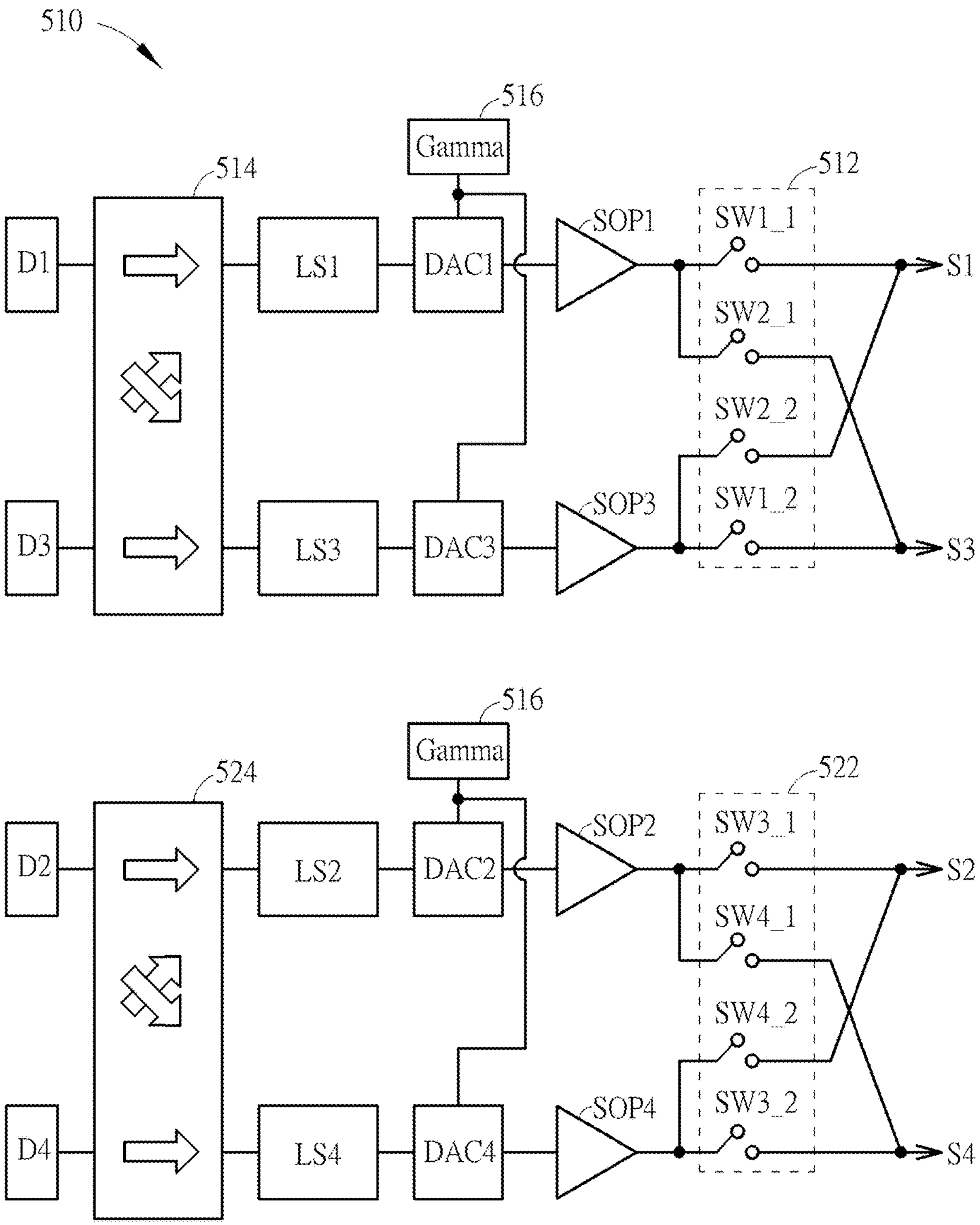
FIG. 7 illustrates a detailed implementation of the display driver circuit.

FIG. 5 only illustrates the driving channels in the display driver circuit 510 for driving the red and blue subpixels in the first and third columns. In fact, the display driver circuit 510 may also include driving channels for driving the green subpixels in the second and fourth columns. FIG. 7 illustrates a detailed implementation of the display driver circuit 510, which includes the two driving channels to be coupled to the data lines S1 and S3 as the implementation shown in FIG. 5, and also includes another two driving channels to be coupled to the data lines S2 and S4.

Similarly, among the driving channels for driving the second and fourth columns of subpixels, each driving channel may include a level shifter (LS2, LS4), a DAC (DAC2, DAC4), and an SOP (SOP2, SOP4). These two driving channels are commonly coupled to an output switching circuit 522 and a data arrangement circuit 524, and also coupled to the gamma circuit 516 of the display driver circuit 510. The output switching circuit 522 may include four switches SW3_1, SW3_2, SW4_1 and SW4_2 coupled between the SOPs SOP2 and SOP4 and two output terminals of the display driver circuit 510 to be coupled to the data lines S2 and S4. The data arrangement circuit 524 may be coupled between the input terminals of the display driver circuit 510 and the level shifters LS2 and LS4. The detailed implementations of the output switching circuit 522 and the data arrangement circuit 524 are similar to those of the output switching circuit 512 and the data arrangement circuit 514, and will not be repeated herein.

Since the subpixels located in the second and fourth columns are all green subpixels, the outputs of the SOPs SOP2 and SOP4 may be alternately switched between the data lines S2 and S4, or may be switched in different manners, or may be fixed to the same data line S2 or S4, through the control of the output switching circuit 522. In fact, the output switching circuit 522 may perform switching in any manner regardless of the switching operation of the output switching circuit 512. The SOPs SOP2 and SOP4 would always drive the green subpixels regardless of the switching operations of the output switching circuit 522, and thus the visual effects of the green color would not be influenced by the output switching under the column chopper operations.

Figure 8:
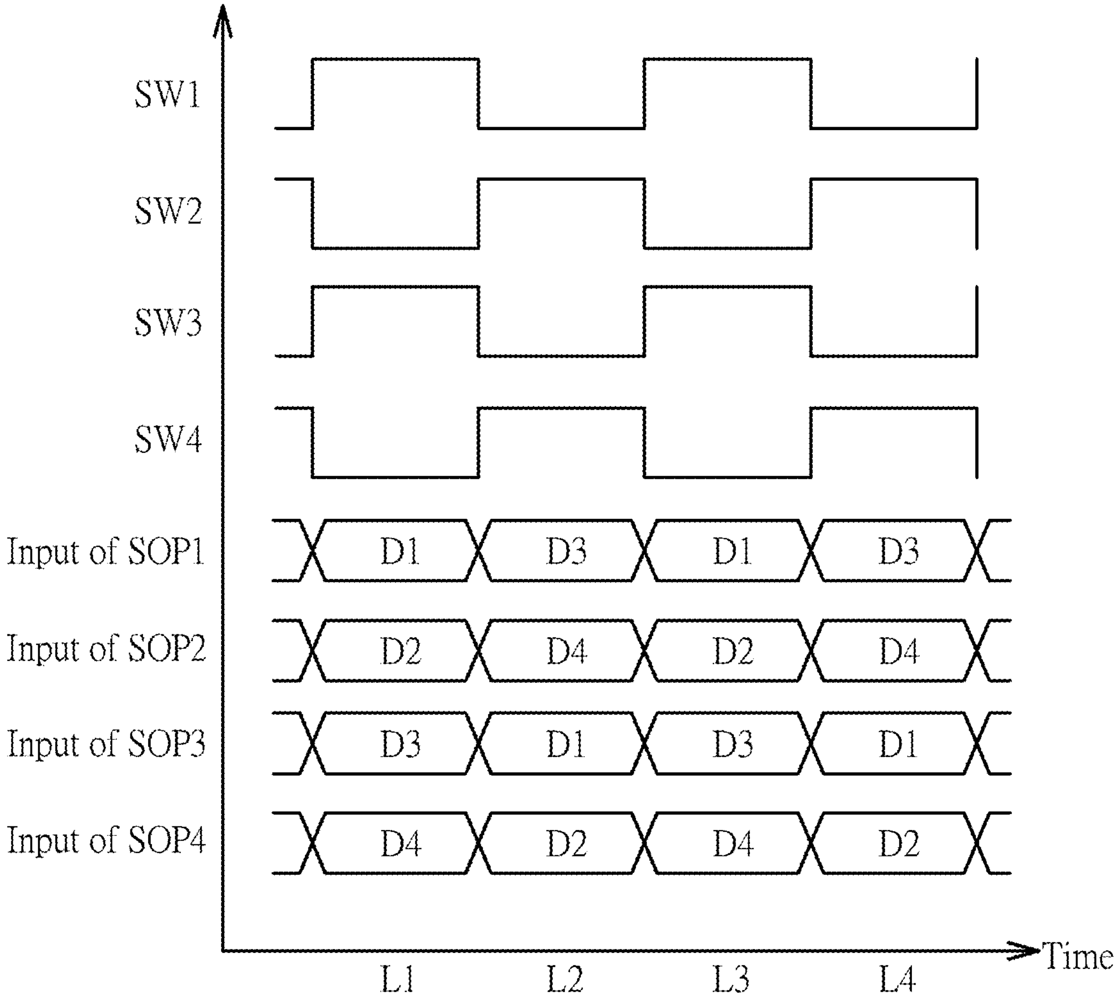
FIGS. 8-13 illustrate various switching operations of the display driver circuit shown in FIG. 7.

FIG. 8 illustrates a switching operation of the display driver circuit 510 shown in FIG. 7, where the waveforms of the control signals SW1-SW4 and the input data of the SOPs SOP1-SOP4 are shown. The control signals SW1-SW4 are used for controlling the output switching circuits 512 and 522. More specifically, the control signal SW1 is used for controlling the switches SW1_1 and SW1_2 in the output switching circuit 512, the control signal SW2 is used for controlling the switches SW2_1 and SW2_2 in the output switching circuit 512, the control signal SW3 is used for controlling the switches SW3_1 and SW3_2 in the output switching circuit 522, and the control signal SW4 is used for controlling the switches SW4_1 and SW4_2 in the output switching circuit 522. In the scan periods for driving the horizontal lines L1, L2, L3 . . . , the output switching circuits 512 and 522 may switch the outputs of the SOPs SOP1-SOP4 to be coupled to different data lines S1-S4 according to the control signals SW1-SW4, thereby controlling each SOP SOP1-SOP4 to drive the subpixels having the same color. The data arrangement circuits 514 and 524 may switch the input terminals of the display driver circuit 510 to different driving channels correspondingly, to control the SOPs SOP1-SOP4 to receive the desired display data D1-D4, allowing the data voltages of the display data D1-D4 to be output to their target subpixels.

Note that the present invention aims at providing a novel switching scheme for a display driver circuit (such as a source driver) to drive the display panel with the column chopper. Those skilled in the art may make modifications and alterations accordingly. For example, the switching scheme of the present invention may be applied to any type of display panel to which the chopper technique is applicable, and the type of the display panel should not be a limitation of the scope of the present invention. In addition, the switching operations would let an SOP to drive subpixels having the same color as much as possible, and the switching method described in the above embodiment is merely an example. An output switching circuit may perform switching in various manners to improve the column chopper effect.

Figure 9:
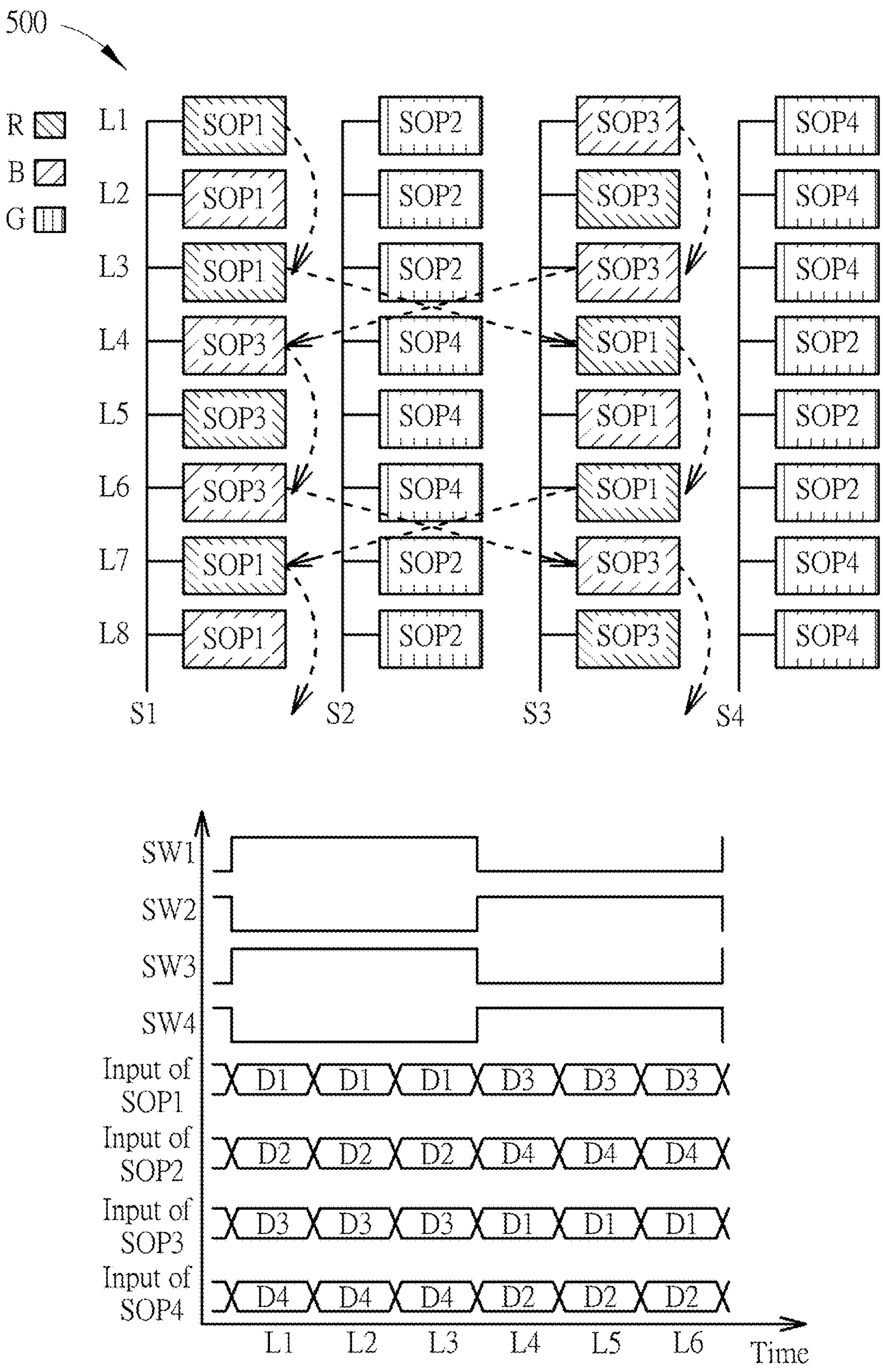

FIG. 9 illustrates another switching operation of the display driver circuit 510, where the waveforms of the control signals SW1-SW4 and the input data of the SOPs SOP1-SOP4 are shown. A subpixel arrangement of the corresponding display panel 500 is also shown in FIG. 9 to facilitate the illustrations. Referring to FIG. 9 along with FIG. 7, the output switching circuit 512 couples the SOP SOP1 to the data line S1 in three scan periods for driving the horizontal lines L1-L3, then couples the SOP SOP1 to the data line S3 in the next three scan periods for driving the horizontal lines L4-L6, and so on. Correspondingly, the output switching circuit 512 couples the SOP SOP3 to the data line S3 in three scan periods for driving the horizontal lines L1-L3, then couples the SOP SOP3 to the data line S1 in the next three scan periods for driving the horizontal lines L4-L6, and so on. In such a situation, the SOP SOP1 is configured to mostly drive the red subpixels, and the SOP SOP3 is configured to mostly drive the blue subpixels. This would also improve the visual effect under the column chopper as compared to the conventional driving operation without output switching.

In this embodiment, the driving of the green subpixels is switched in a similar manner. More specifically, the output switching circuit 522 couples the SOP SOP2 to the data line S2 in three scan periods for driving the horizontal lines L1-L3, then couples the SOP SOP2 to the data line S4 in the next three scan periods for driving the horizontal lines L4-L6, and so on. Correspondingly, the output switching circuit 522 couples the SOP SOP4 to the data line S4 in three scan periods for driving the horizontal lines L1-L3, then couples the SOP SOP4 to the data line S2 in the next three scan periods for driving the horizontal lines L4-L6, and so on. Since the subpixels located in the second and fourth columns are all green subpixels, the switching operation of the output switching circuit 522 may also be different from the switching operation of the output switching circuit 512, and the chopper effect would not be influenced.

Similarly, the data arrangement circuits 514 and 524 may switch the input terminals of the display driver circuit 510 to different driving channels correspondingly, to control the SOPs SOP1-SOP4 to receive the desired display data D1-D4, allowing the data voltages of the display data D1-D4 to be output to their target subpixels.

Figure 10:
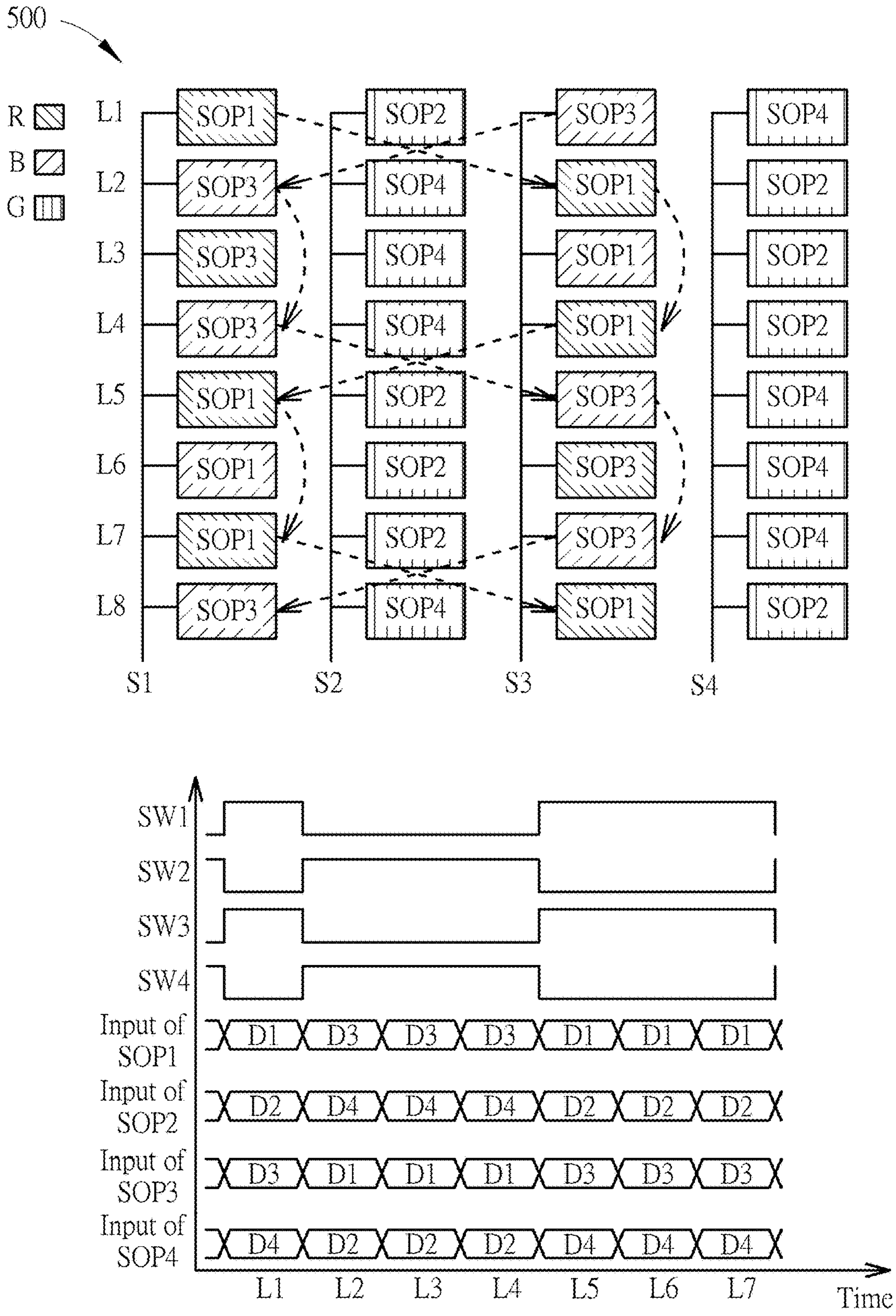

FIG. 10 illustrates another switching operation of the display driver circuit 510, where the waveforms of the control signals SW1-SW4 and the input data of the SOPs SOP1-SOP4 are shown. A subpixel arrangement of the corresponding display panel 500 is also shown in FIG. 10 to facilitate the illustrations. Referring to FIG. 10 along with FIG. 7, the output switching circuit 512 couples the SOP SOP1 to the data line S1 in the first scan period for driving the horizontal line L1, then to the data line S3 in the next three scan periods for driving the horizontal lines L2-L4, then to the data line S1 in the next three scan periods for driving the horizontal lines L5-L7, and then to the data line S3 in the next scan period for driving the horizontal line L8.

Correspondingly, the output switching circuit 512 couples the SOP SOP3 to the data line S3 in the first scan period for driving the horizontal line L1, then to the data line S1 in the next three scan periods for driving the horizontal lines L2-L4, then to the data line S3 in the next three scan periods for driving the horizontal lines L5-L7, and then to the data line S1 in the next scan period for driving the horizontal line L8. The switching operation may be repeated in every 8 scan periods. In such a situation, the SOP SOP1 is configured to mostly drive the red subpixels, and the SOP SOP3 is configured to mostly drive the blue subpixels. This would also improve the visual effect under the column chopper as compared to the conventional driving operation without output switching.

In this embodiment, the driving of the second and fourth columns of subpixels is switched in a similar manner, and the detailed operations of the output switching circuit 522 will not be narrated herein. Since the subpixels located in the second and fourth columns are all green subpixels, in another embodiment, the switching operation of the output switching circuit 522 may be different from the switching operation of the output switching circuit 512, and the chopper effect would not be influenced.

Figure 11:
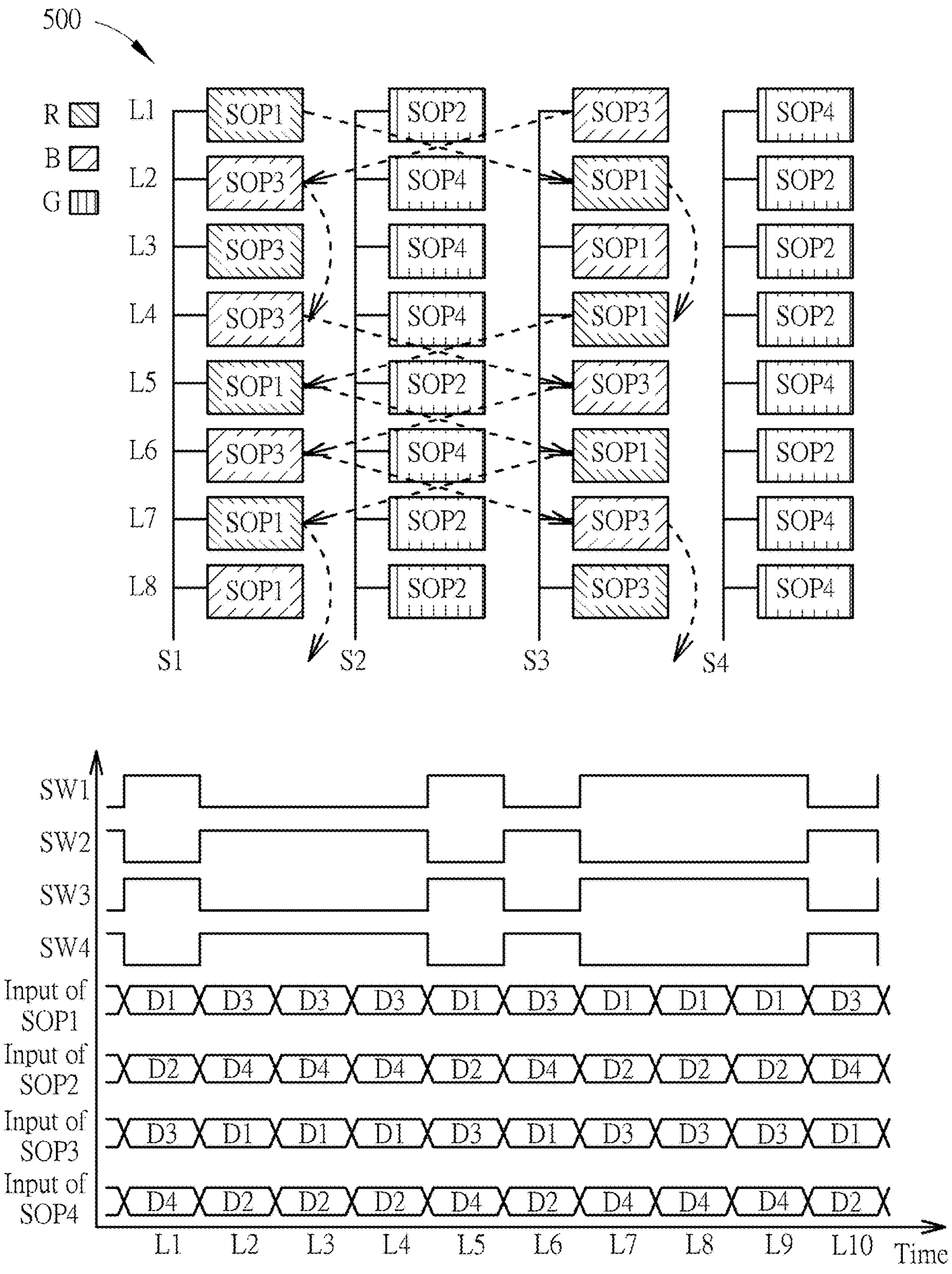

FIG. 11 illustrates another switching operation of the display driver circuit 510, where the waveforms of the control signals SW1-SW4 and the input data of the SOPs SOP1-SOP4 are shown. A subpixel arrangement of the corresponding display panel 500 is also shown in FIG. 11 to facilitate the illustrations. Referring to FIG. 11 along with FIG. 7, the output switching circuit 512 couples the SOP SOP1 to the data line S1 in the first scan period for driving the horizontal line L1, then to the data line S3 in the next three scan periods for driving the horizontal lines L2-L4, then to the data line S1 in the next scan period for driving the horizontal line L5, then to the data line S3 in the next scan period for driving the horizontal line L6, then to the data line S1 in the next three scan periods for driving the horizontal lines L7-L9, and then to the data line S3 in the next scan period for driving the horizontal line L10. Correspondingly, the output switching circuit 512 couples the SOP SOP3 to the data line S3 in the first scan period for driving the horizontal line L1, then to the data line S1 in the next three scan periods for driving the horizontal lines L2-L4, then to the data line S3 in the next scan period for driving the horizontal line L5, then to the data line S1 in the next scan period for driving the horizontal line L6, then to the data line S3 in the next three scan periods for driving the horizontal lines L7-L9, and then to the data line S1 in the next scan period for driving the horizontal line L10. The switching operation may be repeated in every 10 scan periods. In such a situation, the SOP SOP1 is configured to mostly drive the red subpixels, and the SOP SOP3 is configured to mostly drive the blue subpixels. This would also improve the visual effect under the column chopper as compared to the conventional driving operation without output switching.

In this embodiment, the driving of the second and fourth columns of subpixels is switched in a similar manner, and the detailed operations of the output switching circuit 522 will not be narrated herein. Since the subpixels located in the second and fourth columns are all green subpixels, in another embodiment, the switching operation of the output switching circuit 522 may be different from the switching operation of the output switching circuit 512, and the chopper effect would not be influenced.

Figure 12:
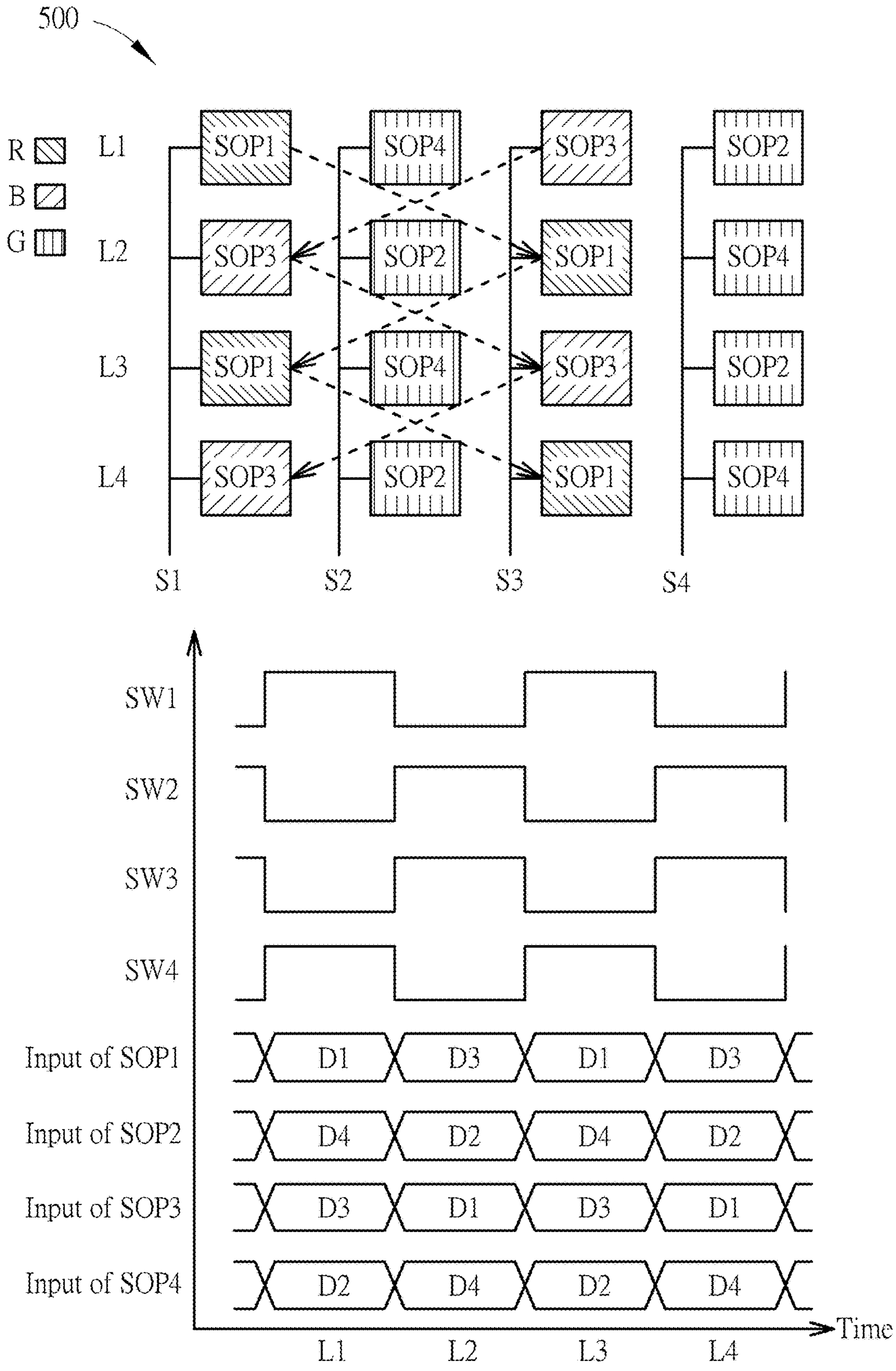

FIG. 12 illustrates another switching operation of the display driver circuit 510, where the waveforms of the control signals SW1-SW4 and the input data of the SOPs SOP1-SOP4 are shown. A subpixel arrangement of the corresponding display panel 500 is also shown in FIG. 12 to facilitate the illustrations. Referring to FIG. 12 along with FIG. 7, the output switching circuit 512 couples the SOP SOP1 to the data line S1 and couples the SOP SOP3 to the data line S3 in the scan periods for driving the odd horizontal lines L1, L3 . . . , and couples the SOP SOP1 to the data line S3 and couples the SOP SOP3 to the data line S1 in the scan periods for driving the even horizontal lines L2, L4 . . . . Based on the switching operation, the SOP SOP1 is configured to always drive the red subpixels, and the SOP SOP3 is configured to always drive the blue subpixels.

In this embodiment, the operation of the output switching circuit 522 is slightly different from the operation of the output switching circuit 512. More specifically, the output switching circuit 522 couples the SOP SOP2 to the data line S2 and couples the SOP SOP4 to the data line S4 in the scan periods for driving the even horizontal lines L2, L4 . . . , and couples the SOP SOP2 to the data line S4 and couples the SOP SOP4 to the data line S2 in the scan periods for driving the odd horizontal lines L1, L3 . . . . Since the subpixels located in the second and fourth columns are all green subpixels, this switching operation of the output switching circuit 522 would also be feasible without influencing the chopper effects.

Figure 13:
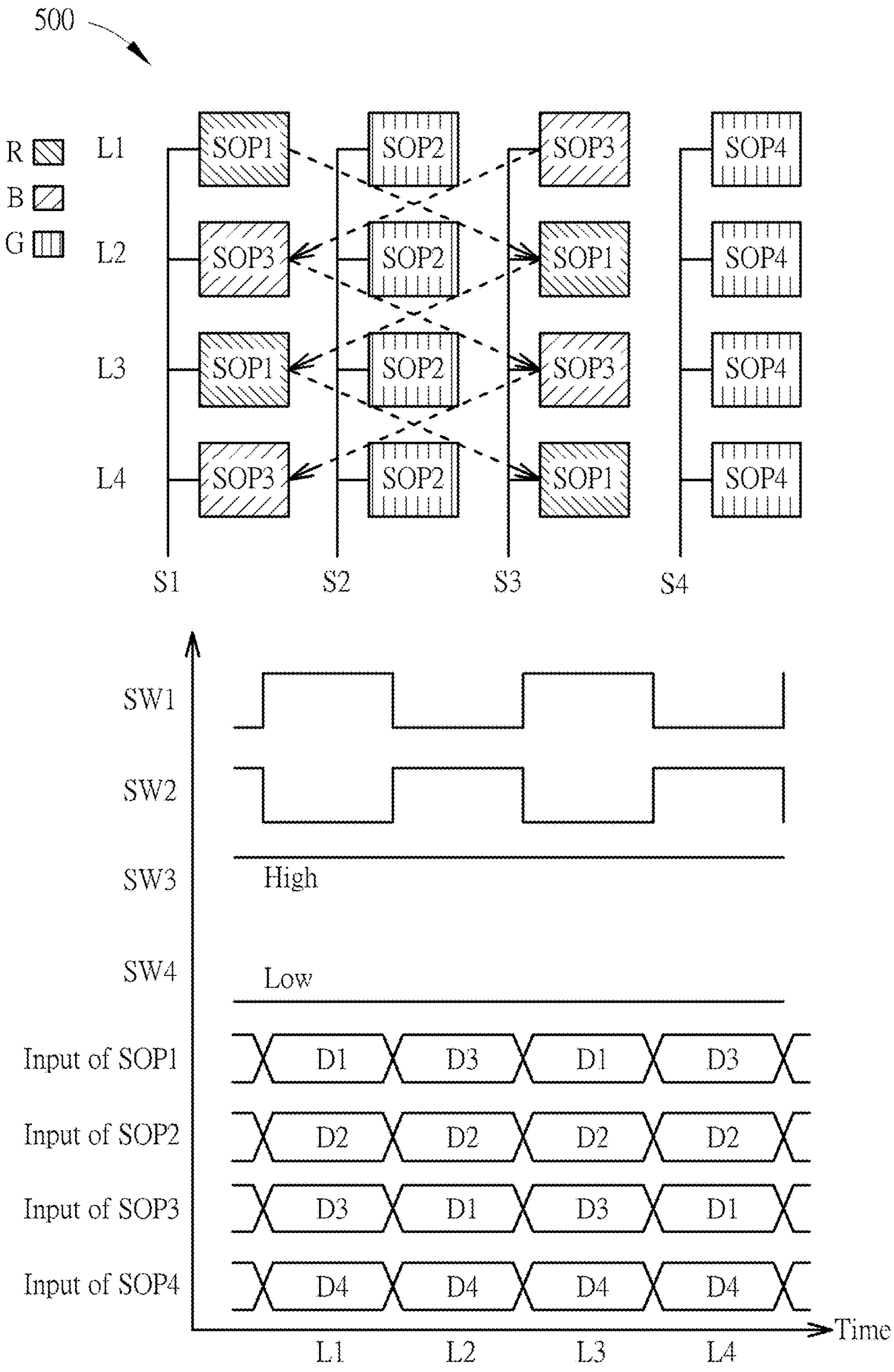

FIG. 13 illustrates a further switching operation of the display driver circuit 510, where the waveforms of the control signals SW1-SW4 and the input data of the SOPs SOP1-SOP4 are shown. A subpixel arrangement of the corresponding display panel 500 is also shown in FIG. 13 to facilitate the illustrations. Referring to FIG. 13 along with FIG. 7, the output switching circuit 512 couples the SOP SOP1 to the data line S1 and couples the SOP SOP3 to the data line S3 in the scan periods for driving the odd horizontal lines L1, L3 . . . , and couples the SOP SOP1 to the data line S3 and couples the SOP SOP3 to the data line S1 in the scan periods for driving the even horizontal lines L2, L4 . . . . Based on the switching operation, the SOP SOP1 is configured to always drive the red subpixels, and the SOP SOP3 is configured to always drive the blue subpixels.

In this embodiment, the operation of the output switching circuit 522 is exactly different from the operation of the output switching circuit 512. More specifically, the output switching circuit 522 couples the SOP SOP2 to the data line S2 and couples the SOP SOP4 to the data line S4 in all scan periods L1, L2, L3, L4 . . . . Since the subpixels located in the second and fourth columns are all green subpixels, this switching operation of the output switching circuit 522 would also be feasible without influencing the chopper effects.

Note that in the above embodiments, the display driver circuit 510 is configured to drive the display panel 500 having a MUX 1:1 architecture. Under the MUX 1:1 architecture, each SOP SOP1-SOP4 is configured to drive a column of subpixels without the usage of MUXs. In another embodiment, the switching scheme of the present invention is applicable to another panel structure, such as the MUX 1:2 architecture with SDL shown in FIG. 2 or the MUX 1:4 architecture with DDL shown in FIG. 3.

Figure 14:
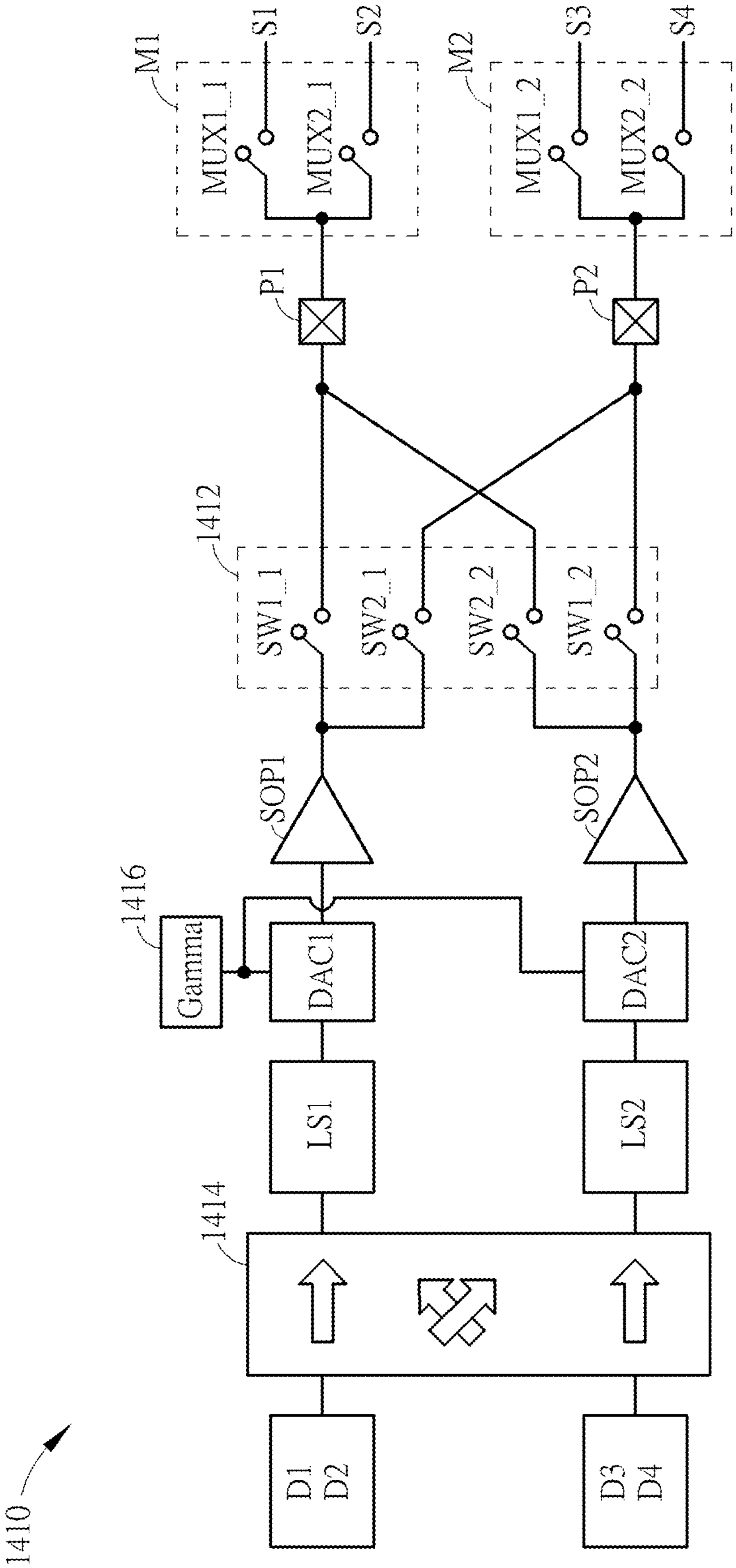
FIG. 14 is a schematic diagram of another display driver circuit according to an embodiment of the present invention.

FIG. 14 is a schematic diagram of another display driver circuit 1410 according to an embodiment of the present invention. The display driver circuit 1410 includes two driving channels, each having a level shifter (LS1, LS2), a DAC (DAC1, DAC2), and an SOP (SOP1, SOP2). These two driving channels are commonly coupled to an output switching circuit 1412 and a data arrangement circuit 1414, and also coupled to a gamma circuit 1416. The output switching circuit 1412 may include four switches SW1_1, SW1_2, SW2_1 and SW2_2 coupled between the SOPs SOP1 and SOP2 and the output pads P1 and P2. The data arrangement circuit 1414 may be coupled between the input terminals of the display driver circuit 1410 and the level shifters LS1 and LS2. The implementations and operations of the output switching circuit 1412 and the data arrangement circuit 1414 are similar to those of the output switching circuit 512 and the data arrangement circuit 514, and will not be detailed herein.

In addition, the display driver circuit 1410 may include a MUX M1, which is coupled to the output switching circuit 1412 through the output pad P1. Therefore, the output pad P1 may be alternately coupled to data lines S1 and S2 through the control of the MUX M1. Similarly, the display driver circuit 1410 may include a MUX M2, which is coupled to the output switching circuit 1412 through the output pad P2. Therefore, the output pad P2 may be alternately coupled to data lines S3 and S4 through the control of the MUX M2. Through the implementation of the MUXs M1 and M2, a driving channel (and/or an SOP) may be used for driving two columns of subpixels on the display panel in a scan period.

In an embodiment, the driving channels of the display driver circuit 1410 may be implemented in a source driver, which is implemented in a DDIC and coupled to the MUXs M1 and M2 through the output pads P1 and P2, respectively. The MUXs M1 and M2 may be deployed on the display panel. In such a situation, the number of output pads of the source driver may be reduced, thereby decreasing the circuit costs.

Note that the display driver circuit 1410 drives the subpixels on the display panel with a fewer number of driving channels. Therefore, a scan period for driving a row of subpixels may be divided into multiple sub-periods, allowing a driving channel to drive different subpixels in the scan period time-divisionally. For example, as shown in FIG. 14, in a scan period for driving the subpixels in the horizontal line L1, the output switching circuit 1412 may couple the SOP SOP1 to the output pad P1 and the MUX M1 and couple the SOP SOP2 to the output pad P2 and the MUX M2. In this scan period, the MUX M1 may further couple the SOP SOP1 to the data line S1 in a sub-period and couple the SOP SOP1 to the data line S2 in another sub-period, and the MUX M2 may further couple the SOP SOP2 to the data line S3 in a sub-period and couple the SOP SOP2 to the data line S4 in another sub-period.

In an exemplary embodiment, the MUX M1 or M2 may be realized by deploying multiple switches. For example, as shown in FIG. 14, the MUX M1 includes two switches MUX1_1 and MUX2_1. The switch MUX1_1 is coupled between the output switching circuit 1412 and the data line S1, and the switch MUX2_1 is coupled between the output switching circuit 1412 and the data line S2. The MUX M2 includes two switches MUX1_2 and MUX2_2. The switch MUX1_2 is coupled between the output switching circuit 1412 and the data line S3, and the switch MUX2_2 is coupled between the output switching circuit 1412 and the data line S4.

Figure 15:
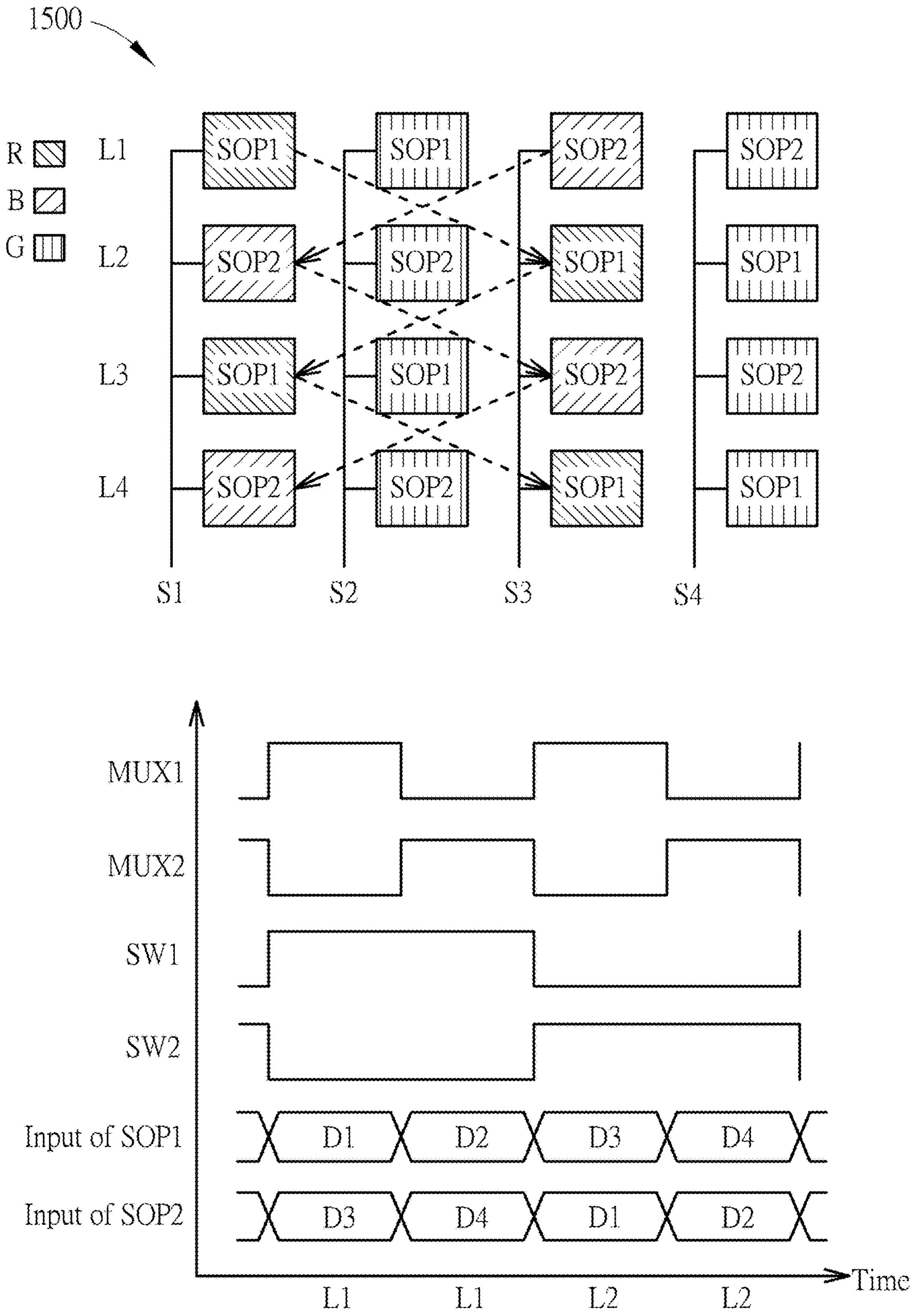
FIG. 15 illustrates a switching operation of the display driver circuit shown in FIG. 14.

FIG. 15 illustrates a switching operation of the display driver circuit 1410 shown in FIG. 14, where the waveforms of control signals SW1, SW2, MUX1 and MUX2 and the input data of the SOPs SOP1 and SOP2 are shown. A subpixel arrangement of a corresponding display panel 1500 controlled by the display driver circuit 1410 is also shown in FIG. 15 to facilitate the illustrations. Referring to FIG. 15 along with FIG. 14, the control signals SW1 and SW2 are used for controlling the output switching circuit 1412. More specifically, the control signal SW1 is used for controlling the switches SW1_1 and SW1_2, and the control signal SW2 is used for controlling the switches SW2_1 and SW2_2. The detailed operations of the control signals SW1 and SW2 are similar to those in the above embodiments, and will not be narrated herein. The control signals MUX1 and MUX2 are used for controlling the MUXs M1 and M2. More specifically, the control signal MUX1 is used for controlling the switches MUX1_1 and MUX1_2, and the control signal MUX2 is used for controlling the switches MUX2_1 and MUX2_2. The data arrangement circuit 1414 may switch the input terminals of the display driver circuit 1410 to be coupled to different driving channels correspondingly, to control the SOPs SOP1 and SOP2 to receive the desired display data D1-D4, allowing the data voltages of the display data D1-D4 to be output to their target subpixels.

As shown in FIG. 15, in the scan period for driving the horizontal line L1, the switches SW1_1 and SW1_2 are turned on by the control signal SW1, to couple the SOP SOP1 to the output pad P1 and couple the SOP SOP2 to the output pad P2. In the first sub-period of this scan period, the switch MUX1_1 in the MUX M1 and the switch MUX1_2 in the MUX M2 are turned on by the control signal MUX1, to further couple the output pad P1 to the data line S1 and couple the output pad P2 to the data line S3; hence, the SOP SOP1 may drive the red subpixel located in the first column in the horizontal line L1, and the SOP SOP2 may drive the blue subpixel located in the third column in the horizontal line L1. In the second sub-period of this scan period, the switch MUX2_1 in the MUX M1 and the switch MUX2_2 in the MUX M2 are turned on by the control signal MUX2, to further couple the output pad P1 to the data line S2 and couple the output pad P2 to the data line S4; hence, the SOP SOP1 may drive the green subpixel located in the second column in the horizontal line L1, and the SOP SOP2 may drive the green subpixel located in the fourth column in the horizontal line L1.

Subsequently, in the next scan period for driving the horizontal line L2, the switches SW2_1 and SW2_2 are turned on by the control signal SW2, to couple the SOP SOP1 to the output pad P2 and couple the SOP SOP2 to the output pad P1. In the first sub-period of this scan period, the switch MUX1_1 in the MUX M1 and the switch MUX1_2 in the MUX M2 are turned on by the control signal MUX1, to further couple the output pad P1 to the data line S1 and couple the output pad P2 to the data line S3; hence, the SOP SOP1 may drive the red subpixel located in the third column in the horizontal line L2, and the SOP SOP2 may drive the blue subpixel located in the first column in the horizontal line L2. In the second sub-period of this scan period, the switch MUX2_1 in the MUX M1 and the switch MUX2_2 in the MUX M2 are turned on by the control signal MUX2, to further couple the output pad P1 to the data line S2 and couple the output pad P2 to the data line S4; hence, the SOP SOP1 may drive the green subpixel located in the fourth column in the horizontal line L2, and the SOP SOP2 may drive the green subpixel located in the second column in the horizontal line L2.

The output switching circuit 1412 and the MUXs M1 and M2 may perform switching continuously and repeatedly in this manner. In such a situation, all red subpixels located in the first column and the third column are driven by the same SOP SOP1, and all blue subpixels located in the first column and the third column are driven by the same SOP SOP2. Since the same SOP has the same voltage offset, the image difference caused by the voltage offset may be perfectly averaged out for both red and blue subpixels under the chopper operation.

In addition, one half of the green subpixels located in the second column and the fourth column are driven by the SOP SOP1, and the other half of the green subpixels located in the second column and the fourth column are driven by the SOP SOP2. Due to similar reasons, the image difference caused by the voltage offset may also be perfectly averaged out for green subpixels under the chopper operation.

Note that various switching operations of the display driver circuit described in the above embodiments may also be applied to the MUX 1:2 with SDL panel structure shown in FIG. 14. Their detailed operations may be easily inferred by those skilled in the art, and will not be narrated herein.

Figure 16:
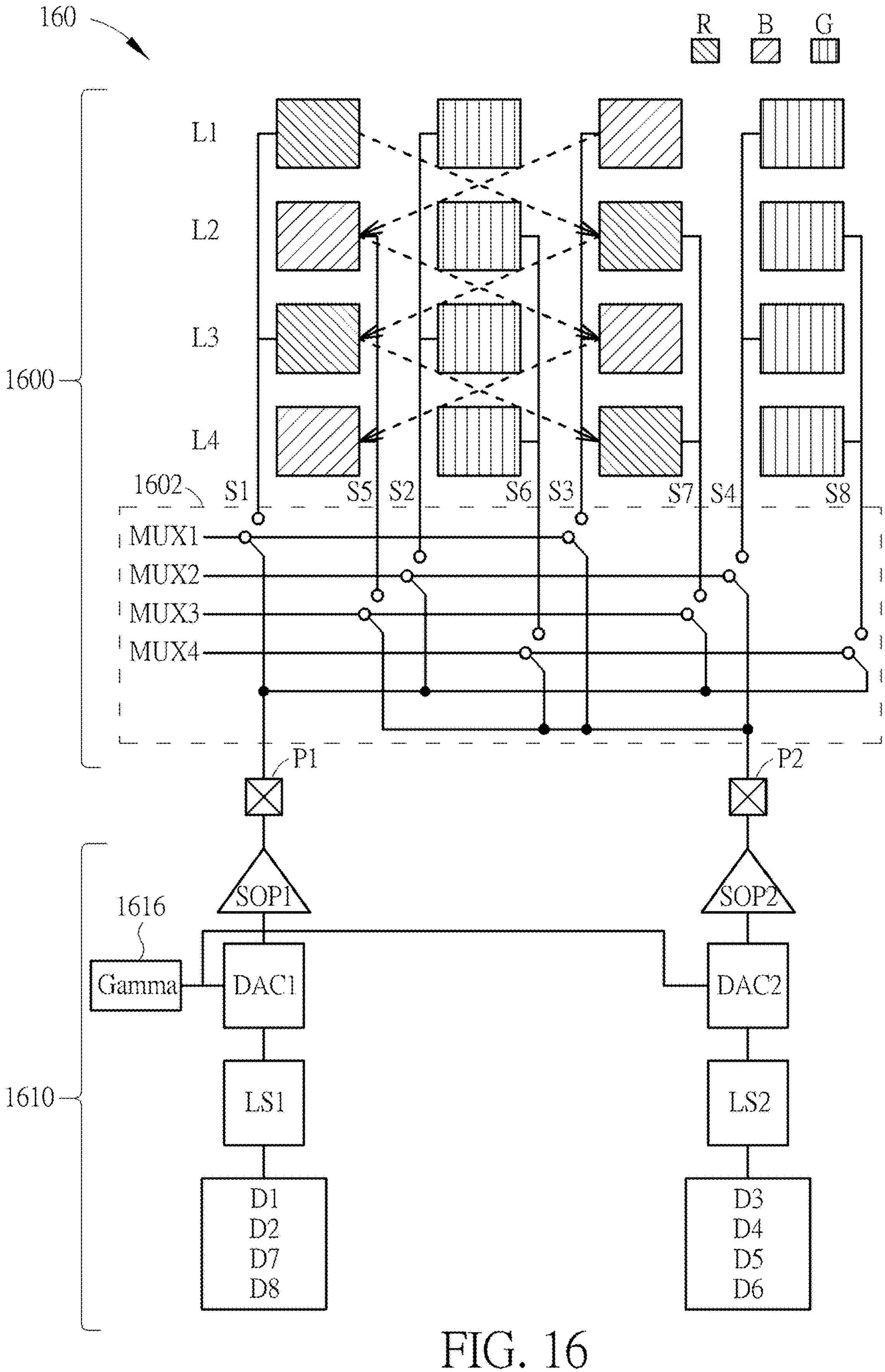
FIG. 16 is a schematic diagram of a display system according to an embodiment of the present invention.

FIG. 16 is a schematic diagram of a display system 160 according to an embodiment of the present invention. The display system 160 includes a display panel 1600 and a source driver 1610 for controlling the display panel 1600. The display panel 1600 has a MUX 1:4 architecture with DDL panel structure, which includes a MUX circuit 1602 coupled between the subpixel array and the source driver 1610. Based on the MUX 1:4 architecture, the driving channels of the source driver 1610 are able to control fourfold numbers of data lines. Based on the DDL panel structure, each column of subpixels are coupled to the source driver 1610 through two data lines. As shown in FIG. 16, the subpixel array is coupled to the source driver 1610 through the MUX circuit 1602; hence, the MUX circuit 1602 may be coupled to each column of subpixels through two data lines.

In this embodiment, the source driver 1610 and the MUX circuit 1602 may be considered as included in a display driver circuit for controlling the operations of the display panel 1600. The source driver 1610 may be implemented in a DDIC to be coupled to the MUX circuit 1602 through output pads P1 and P2. The MUX circuit 1602 may be deployed on the display panel 1600. Similarly, since four columns of subpixels are controlled by two output pads, the circuit costs of the DDIC may be reduced.

As shown in FIG. 16, there may be two driving channels and two SOPs SOP1 and SOP2 in the source driver 1610, which may be configured to drive 4 columns of subpixels through 8 data lines S1-S8 and the MUX circuit 1602. Each driving channel may include a level shifter (LS1, LS2), a DAC (DAC1, DAC2), and an SOP (SOP1, SOP2). These two driving channels are commonly coupled to a gamma circuit 1616. The implementations of the driving channels are similar to those of the driving channels in the above embodiments, except that there is no output switching circuit and no data arrangement circuit included in the source driver 1610. In this embodiment, the SOPs SOP1 and SOP2 may be coupled to target data lines and target subpixels through the control of the MUX circuit 1602, and there is no need to swap the SOPs between different data lines. In such a situation, the output switching circuit may be omitted. Since the SOP outputs are not swapped, the inputs of the source driver 1610 do not need to be swapped; hence, the data arrangement circuit may also be omitted.

From another viewpoint, the MUX circuit 1602 coupled between the subpixels and the SOPs SOP1 and SOP2 may be considered as including an output switching circuit, which switches the output of the SOP SOP1 to be coupled to different data lines S1, S2, S7 and S8 in different scan periods or sub-periods, and switches the output of the SOP SOP2 to be coupled to different data lines S3, S4, S5 and S6 in different scan periods or sub-periods.

Based on the SPR, the subpixel array of the display panel 1600 may be deployed to have red and blue subpixels in the first column and the third column, and green subpixels in the second column and the fourth column. In order to achieve the purpose that the subpixels having the same color are driven by the same SOP, the MUX circuit 1602 may couple the red subpixels located in the first column and the third column to the SOP SOP1, and couple the blue subpixels located in the first column and the third column to the SOP SOP2.

In detail, among the first column of subpixels, red subpixels are coupled to the MUX circuit 1602 through the data line S1 and blue subpixels are coupled to the MUX circuit 1602 through the data line S5. Among the third column of subpixels, red subpixels are coupled to the MUX circuit 1602 through the data line S7 and blue subpixels are coupled to the MUX circuit 1602 through the data line S3. Therefore, through well control of the MUX circuit 1602, the data lines S1 and S7 may further be coupled to the SOP SOP1 and the data lines S3 and S5 may further be coupled to the SOP SOP2, so that the red subpixels may be driven by the SOP SOP1 and the blue subpixels may be driven by the SOP SOP2. In such a situation, the subpixels having the same color could be driven by the same SOP, thereby improving the visual effect under the column chopper operation.

In an exemplary embodiment as shown in FIG. 16, the MUX circuit 1602 may include a plurality of switches for respectively coupling the data lines S1-S8 to the target SOP SOP1 or SOP2. More specifically, each switch of the MUX circuit 1602 may be coupled between one of the data lines S1-S8 and one of the SOPs SOP1 and SOP2. With appropriate arrangement of the switches in the MUX circuit 1602, each data line used for red subpixels (including S1 and S7) is coupled to the SOP SOP1 through a switch, and each data line used for blue subpixels (including S3 and S5) is coupled to the SOP SOP2 through a switch. As for the green subpixels located in the second and fourth columns, the corresponding switches may also be arranged appropriately so that one half of the green subpixels may be driven by the SOP SOP1 and the other half of the green subpixels may be driven by the SOP SOP2.

Figure 17:
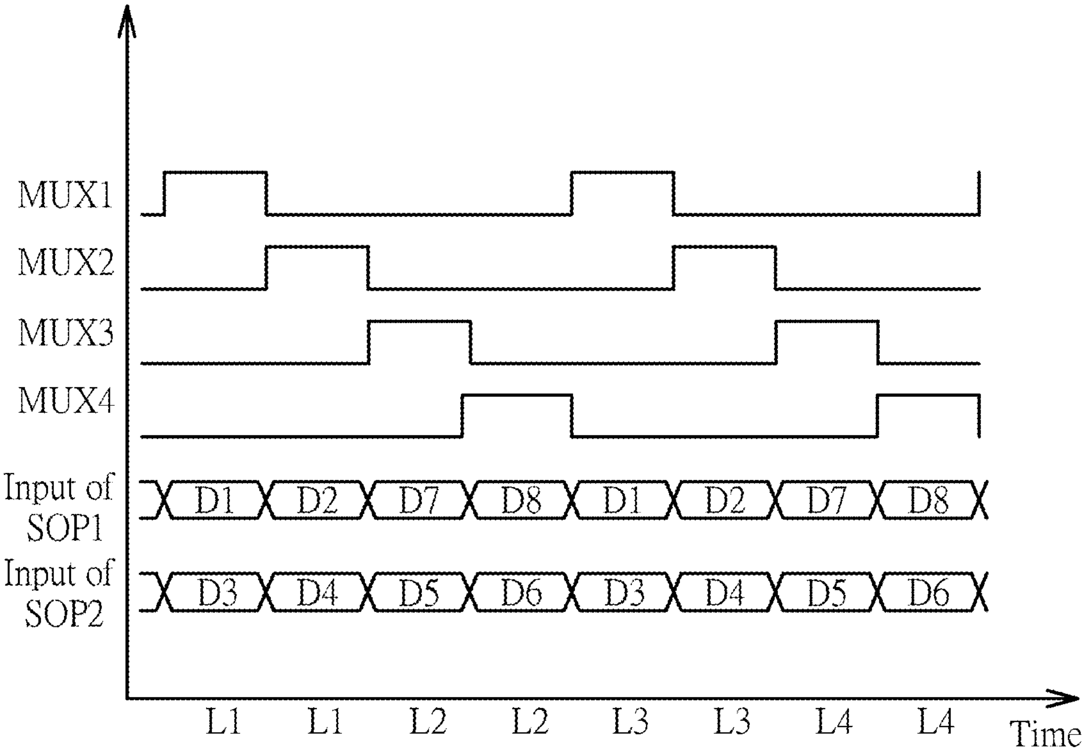
FIG. 17 illustrates a switching operation of the source driver shown in FIG. 16.

FIG. 17 illustrates a switching operation of the source driver 1610 shown in FIG. 16, where the waveforms of control signals MUX1-MUX4 and the input data of the SOPs SOP1 and SOP2 are shown. The control signals MUX1-MUX4 are used for controlling the corresponding switches in the MUX circuit 1602. The display data D1-D8 are used for the subpixels corresponding to the data lines S1-S8, respectively.

Referring to FIG. 17 along with FIG. 16, in the first scan period, the source driver 1610 is configured to drive the horizontal line L1. In the first sub-period of this scan period, the control signal MUX1 turns on the corresponding switches in the MUX circuit 1602 to couple the SOP SOP1 to the data line S1 and couple the SOP SOP2 to the data line S3; hence, the SOP SOP1 may drive the red subpixel located in the first column in the horizontal line L1, and the SOP SOP2 may drive the blue subpixel located in the third column in the horizontal line L1. Correspondingly, the first driving channel receives the display data D1 and the second driving channel receives the display data D3. In the second sub-period of this scan period, the control signal MUX2 turns on the corresponding switches in the MUX circuit 1602 to couple the SOP SOP1 to the data line S2 and couple the SOP SOP2 to the data line S4; hence, the SOP SOP1 may drive the green subpixel located in the second column in the horizontal line L1, and the SOP SOP2 may drive the green subpixel located in the fourth column in the horizontal line L1. Correspondingly, the first driving channel receives the display data D2 and the second driving channel receives the display data D4.

Subsequently, in the next scan period, the source driver 1610 is configured to drive the horizontal line L2. In the first sub-period of this scan period, the control signal MUX3 turns on the corresponding switches in the MUX circuit 1602 to couple the SOP SOP1 to the data line S7 and couple the SOP SOP2 to the data line S5; hence, the SOP SOP1 may drive the red subpixel located in the third column in the horizontal line L2, and the SOP SOP2 may drive the blue subpixel located in the first column in the horizontal line L2. Correspondingly, the first driving channel receives the display data D7 and the second driving channel receives the display data D5. In the second sub-period of this scan period, the control signal MUX4 turns on the corresponding switches in the MUX circuit 1602 to couple the SOP SOP1 to the data line S8 and couple the SOP SOP2 to the data line S6; hence, the SOP SOP1 may drive the green subpixel located in the fourth column in the horizontal line L2, and the SOP SOP2 may drive the green subpixel located in the second column in the horizontal line L2. Correspondingly, the first driving channel receives the display data D8 and the second driving channel receives the display data D6.

The MUX circuit 1602 may perform switching continuously and repeatedly in this manner. In such a situation, all red subpixels located in the first column and the third column are driven by the same SOP SOP1, and all blue subpixels located in the first column and the third column are driven by the same SOP SOP2. Since the same SOP has the same voltage offset, the image difference caused by the voltage offset may be perfectly averaged out for both red and blue subpixels under the chopper operation.

In addition, as for the green subpixels located in the second column and the fourth column, one half of these green subpixels are driven by the SOP SOP1 and the other half are driven by the SOP SOP2. Due to similar reasons, the image difference caused by the voltage offset may also be perfectly averaged out for green subpixels under the chopper operation.

Figure 18:
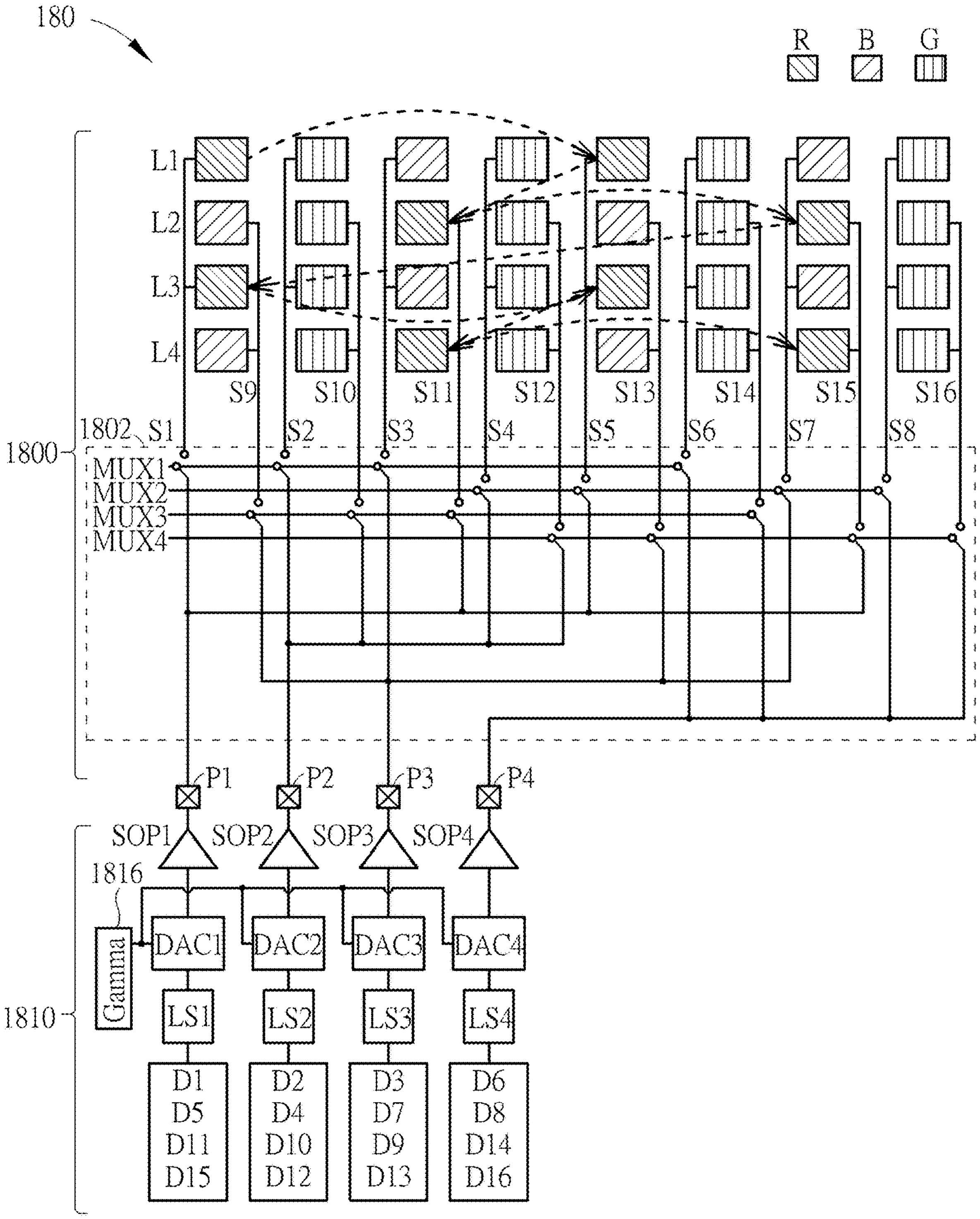
FIG. 18 is a schematic diagram of another display system according to an embodiment of the present invention.

FIG. 18 is a schematic diagram of another display system 180 according to an embodiment of the present invention. The display system 180 includes a display panel 1800 and a source driver 1810 for controlling the display panel 1800. The display panel 1800 has a MUX 4:8 architecture with DDL panel structure, which includes a MUX circuit 1802 coupled between the subpixel array and the source driver 1810. Based on the MUX 4:8 architecture, the driving channels of the source driver 1810 are able to control double numbers of data lines. Based on the DDL panel structure, each column of subpixels are coupled to the source driver 1810 through two data lines. As shown in FIG. 18, the subpixel array is coupled to the source driver 1810 through the MUX circuit 1802; hence, the MUX circuit 1802 may be coupled to each column of subpixels through two data lines.

In this embodiment, the source driver 1810 and the MUX circuit 1802 may be considered as included in a display driver circuit for controlling the operations of the display panel 1800. The source driver 1810 may be implemented in a DDIC to be coupled to the MUX circuit 1802 through output pads P1-P4. The MUX circuit 1802 may be deployed on the display panel 1800. Since eight columns of subpixels are controlled by four output pads, the circuit costs of the DDIC may be reduced.

As shown in FIG. 18, there may be four driving channels and four SOPs SOP1-SOP4 in the source driver 1810, which may be configured to drive 8 columns of subpixels through 16 data lines S1-S16 and the MUX circuit 1802. Each driving channel may include a level shifter (LS1-LS4), a DAC (DAC1-DAC4), and an SOP (SOP1-SOP4). These four driving channels are commonly coupled to a gamma circuit 1816. The implementations of the driving channels are similar to those of the driving channels in the source driver 1610, and will not be detailed herein. Note that there is no output switching circuit and no data arrangement circuit included in the source driver 1810, either. It may also be considered that the output switching circuit is included in or integrated with the MUX circuit 1802, to switch the output of the SOPs SOP1-SOP4 to be coupled to different data lines in different scan periods or sub-periods.

Based on the SPR, the subpixel array of the display panel 1800 may be deployed to have red and blue subpixels in the first, third, fifth and seventh columns, and green subpixels in the second, fourth, sixth and eighth columns. In order to achieve the purpose that the subpixels having the same color are driven by the same SOP, the MUX circuit 1802 may couple the red subpixels located in the first, third, fifth and seventh columns to the SOP SOP1, and couple the blue subpixels located in the first, third, fifth and seventh columns to the SOP SOP3.

In detail, among the first column of subpixels, red subpixels are coupled to the MUX circuit 1802 through the data line S1 and blue subpixels are coupled to the MUX circuit 1802 through the data line S9. Among the third column of subpixels, red subpixels are coupled to the MUX circuit 1802 through the data line S11 and blue subpixels are coupled to the MUX circuit 1802 through the data line S3. Among the fifth column of subpixels, red subpixels are coupled to the MUX circuit 1802 through the data line S5 and blue subpixels are coupled to the MUX circuit 1802 through the data line S13. Among the seventh column of subpixels, red subpixels are coupled to the MUX circuit 1802 through the data line S15 and blue subpixels are coupled to the MUX circuit 1802 through the data line S7. Therefore, through well control of the MUX circuit 1802, the data lines S1, S5, S11 and S15 may further be coupled to the SOP SOP1 and the data lines S3, S7, S9 and S13 may further be coupled to the SOP SOP3, so that the red subpixels may be driven by the SOP SOP1 and the blue subpixels may be driven by the SOP SOP3. In such a situation, the subpixels having the same color could be driven by the same SOP, thereby improving the visual effect under the column chopper operation.

In an exemplary embodiment as shown in FIG. 18, the MUX circuit 1802 may include a plurality of switches for respectively coupling the data lines S1-S16 to the target SOP SOP1-SOP4. More specifically, each switch of the MUX circuit 1802 may be coupled between one of the data lines S1-S16 and one of the SOPs SOP1-SOP4. With appropriate arrangement of the switches in the MUX circuit 1802, each data line used for red subpixels (including S1, S5, S11 and S15) is coupled to the SOP SOP1 through a switch, and each data line used for blue subpixels (including S3, S7, S9 and S13) is coupled to the SOP SOP3 through a switch. As for the green subpixels located in the second, fourth sixth and eighth columns, the corresponding switches may also be arranged appropriately so that one half of the green subpixels may be driven by the SOP SOP2 and the other half of the green subpixels may be driven by the SOP SOP4.

Figure 19:
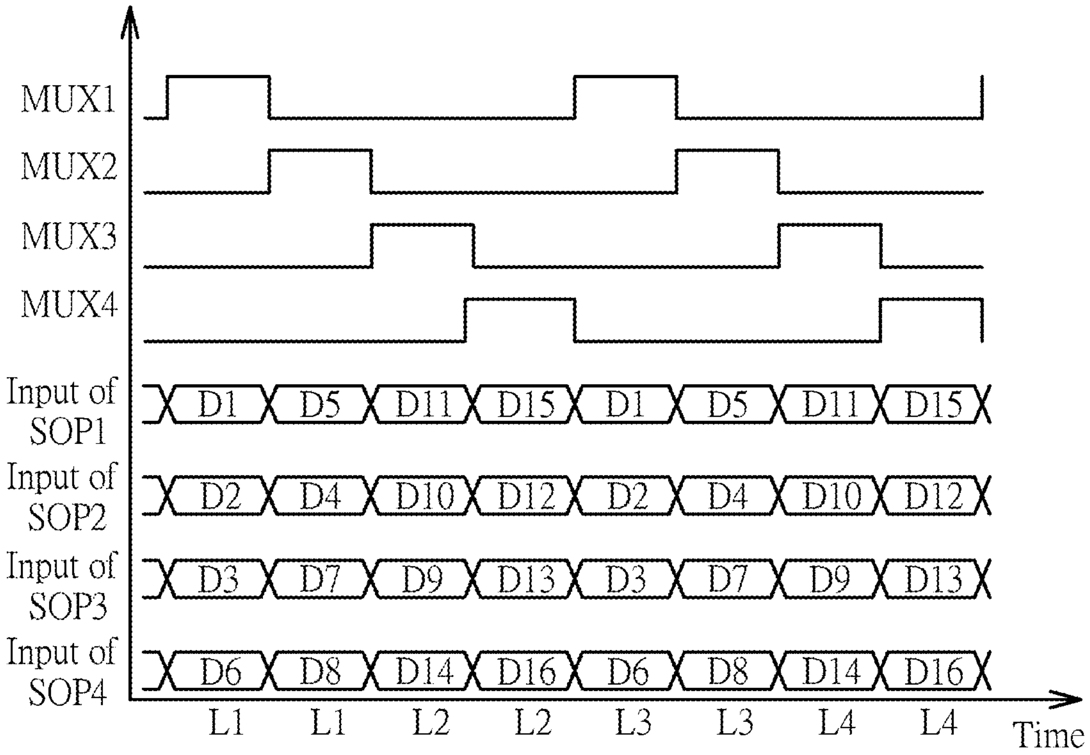
FIG. 19 illustrates a switching operation of the source driver shown in FIG. 18.

FIG. 19 illustrates a switching operation of the source driver 1810 shown in FIG. 18, where the waveforms of control signals MUX1-MUX4 and the input data of the SOPs SOP1-SOP4 are shown. The control signals MUX1-

MUX4 are used for controlling the corresponding switches in the MUX circuit 1802. The display data D1-D16 are used for the subpixels corresponding to the data lines S1-S16, respectively.

Referring to FIG. 19 along with FIG. 18, in the first scan period, the source driver 1810 is configured to drive the horizontal line L1. In the first sub-period of this scan period, the control signal MUX1 turns on the corresponding switches in the MUX circuit 1802 to couple the SOP SOP1 to the data line S1, couple the SOP SOP2 to the data line S2, couple the SOP SOP3 to the data line S3, and couple the SOP SOP4 to the data line S6; hence, the SOP SOP1 may drive the red subpixel located in the first column in the horizontal line L1, the SOP SOP2 may drive the green subpixel located in the second column in the horizontal line L1, the SOP SOP3 may drive the blue subpixel located in the third column in the horizontal line L1, and the SOP SOP4 may drive the green subpixel located in the sixth column in the horizontal line L1. Correspondingly, the first to fourth driving channels receive the display data D1, D2, D3 and D6, respectively. In the second sub-period of this scan period, the control signal MUX2 turns on the corresponding switches in the MUX circuit 1802 to couple the SOP SOP1 to the data line S5, couple the SOP SOP2 to the data line S4, couple the SOP SOP3 to the data line S7, and couple the SOP SOP4 to the data line S8; hence, the SOP SOP1 may drive the red subpixel located in the fifth column in the horizontal line L1, the SOP SOP2 may drive the green subpixel located in the fourth column in the horizontal line L1, the SOP SOP3 may drive the blue subpixel located in the seventh column in the horizontal line L1, and the SOP SOP4 may drive the green subpixel located in the eighth column in the horizontal line L1. Correspondingly, the first to fourth driving channels receive the display data D5, D4, D7 and D8, respectively.

Subsequently, in the next scan period, the source driver 1810 is configured to drive the horizontal line L2. In the first sub-period of this scan period, the control signal MUX3 turns on the corresponding switches in the MUX circuit 1802 to couple the SOP SOP1 to the data line S11, couple the SOP SOP2 to the data line S10, couple the SOP SOP3 to the data line S9, and couple the SOP SOP4 to the data line 514; hence, the SOP SOP1 may drive the red subpixel located in the third column in the horizontal line L2, the SOP SOP2 may drive the green subpixel located in the second column in the horizontal line L2, the SOP SOP3 may drive the blue subpixel located in the first column in the horizontal line L2, and the SOP SOP4 may drive the green subpixel located in the sixth column in the horizontal line L2. Correspondingly, the first to fourth driving channels receive the display data D11, D10, D9 and D14, respectively. In the second sub-period of this scan period, the control signal MUX4 turns on the corresponding switches in the MUX circuit 1802 to couple the SOP SOP1 to the data line 515, couple the SOP SOP2 to the data line 512, couple the SOP SOP3 to the data line 513, and couple the SOP SOP4 to the data line 516; hence, the SOP SOP1 may drive the red subpixel located in the seventh column in the horizontal line L2, the SOP SOP2 may drive the green subpixel located in the fourth column in the horizontal line L2, the SOP SOP3 may drive the blue subpixel located in the fifth column in the horizontal line L2, and the SOP SOP4 may drive the green subpixel located in the eighth column in the horizontal line L2. Correspondingly, the first to fourth driving channels receive the display data D15, D12, D13 and D16, respectively.

The MUX circuit 1802 may perform switching continuously and repeatedly in this manner. In such a situation, all red subpixels located in the first, third, fifth and seventh columns are driven by the same SOP SOP1, and all blue subpixels located in the first, third, fifth and seventh columns are driven by the same SOP SOP3. Since the same SOP has the same voltage offset, the image difference caused by the voltage offset may be perfectly averaged out for both red and blue subpixels under the chopper operation.

In addition, as for the green subpixels located in the second, fourth, sixth and eighth columns, one half of these green subpixels are driven by the SOP SOP2 and the other half are driven by the SOP SOP4. Due to similar reasons, the image difference caused by the voltage offset may also be perfectly averaged out for green subpixels under the chopper operation.

In the embodiments shown in FIGS. 16 and 18, the outputs of the SOPs are well controlled by the MUX circuit, allowing the subpixels having the same color to be driven by the same SOP. In such a situation, the MUX circuit may be used for coupling one SOP to multiple data lines, and also be used for improving the performance of the chopper operation through appropriate arrangements of the switches inside, where no additional output switching circuit is needed. In the above embodiments, the MUX circuit is deployed on the display panel. In another embodiment, the MUX circuit may be included in the DDIC or implemented in another manner, which should also belong to the scope of the present invention.

To sum up, the present invention provides a display driver circuit and a related switching scheme to drive the display panel with the column chopper. In an embodiment, the display driver circuit may include an output switching circuit, which controls the output of an SOP to be switched between different data lines. In an embodiment, the display driver circuit may include a MUX or MUX circuit, which allows an SOP to be selectively coupled to different data lines. In an embodiment, the MUX circuit may be deployed appropriately to control the SOP to be coupled to target subpixels located in specific columns. Through the implementation of the present invention, the subpixels having the same color may be driven by the same SOP, so that the performance of the chopper operation may be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display driver circuit for controlling a display panel, comprising:

a first operational amplifier;

a second operational amplifier; and a first output switching circuit, coupled to the first operational amplifier and the second operational amplifier;

wherein the first output switching circuit couples the first operational amplifier to a first data line of the display panel in a first scan period, to control the first operational amplifier to drive a first subpixel located on the first data line and having a first color;

wherein the first output switching circuit couples the first operational amplifier to a second data line of the display panel in a second scan period, to control the first operational amplifier to drive a second subpixel located on the second data line and having the first color.

2. The display driver circuit of claim 1, wherein the first output switching circuit further couples the second operational amplifier to the second data line in the first scan period, to control the second operational amplifier to drive a third subpixel having a second color through the second data line, and couples the second operational amplifier to the first data line in the second scan period, to control the second operational amplifier to drive a fourth subpixel having the second color through the first data line.

3. The display driver circuit of claim 2, wherein one of the first color and the second color is red, and the other of the first color and the second color is blue.

4. The display driver circuit of claim 2, wherein the first subpixel and the fourth subpixel are located in a first column, and the second subpixel and the third subpixel are located in a second column.

5. The display driver circuit of claim 1, wherein the first output switching circuit comprises:

a first switch, coupled between the first operational amplifier and a first output terminal of the display driver circuit;

a second switch, coupled between the first operational amplifier and a second output terminal of the display driver circuit;

a third switch, coupled between the second operational amplifier and the first output terminal; and a fourth switch, coupled between the second operational amplifier and the second output terminal.

6. The display driver circuit of claim 5, wherein the first switch and the fourth switch are on and the second switch and the third switch are off in the first scan period, and the second switch and the third switch are on and the first switch and the fourth switch are off in the second scan period.

7. The display driver circuit of claim 1, further comprising:

a data arrangement circuit to couple a first input terminal of the display driver circuit to the first operational amplifier and couple a second input terminal of the display driver circuit to the second operational amplifier in the first scan period, and couple the first input terminal to the second operational amplifier and couple the second input terminal to the first operational amplifier in the second scan period.

8. The display driver circuit of claim 1, wherein the display driver circuit drives a first row of subpixels in the first scan period, and drives a second row of subpixels in the second scan period.

9. The display driver circuit of claim 1, further comprising:

a third operational amplifier;

a fourth operational amplifier; and a second output switching circuit, coupled to the third operational amplifier and the fourth operational amplifier;

wherein a switching operation of the second output switching circuit is performed regardless of a switching operation of the first output switching circuit.

10. The display driver circuit of claim 1, further comprising:

a third operational amplifier;

a fourth operational amplifier; and a second output switching circuit, coupled to the third operational amplifier and the fourth operational amplifier;

wherein the second output switching circuit couples the third operational amplifier to a third data line of the display panel and couples the fourth operational amplifier to a fourth data line of the display panel in the second scan period, and couples the third operational amplifier to the fourth data line and couples the fourth operational amplifier to the third data line in the first scan period;

wherein the third data line is adjacent to the first data line, and the fourth data line is adjacent to the second data line.

11. The display driver circuit of claim 1, further comprising:

a third operational amplifier;

a fourth operational amplifier; and a second output switching circuit, coupled to the third operational amplifier and the fourth operational amplifier;

wherein the second output switching circuit couples the third operational amplifier to a third data line of the display panel and couples the fourth operational amplifier to a fourth data line of the display panel in the first scan period and the second scan period.

12. The display driver circuit of claim 1, wherein the first output switching circuit couples the first operational amplifier to a multiplexer in the first scan period, and the multiplexer couples the first operational amplifier to the first data line in a first sub-period of the first scan period and couples the first operational amplifier to a third data line of the display panel in a second sub-period of the first scan period.

13. The display driver circuit of claim 12, wherein the multiplexer comprises:

a first switch, coupled between the first output switching circuit and the first data line; and a second switch, coupled between the first output switching circuit and the third data line.

14. The display driver circuit of claim 13, wherein the first switch is on and the second switch is off in the first sub-period, and the second switch is on and the first switch is off in the second sub-period.

15. The display driver circuit of claim 1, wherein the first output switching circuit comprises a multiplexer circuit, which is coupled to each of a plurality of columns of subpixels on the display panel through at least two data lines.

16. The display driver circuit of claim 15, wherein the multiplexer circuit couples a plurality of subpixels having the first color located in a first column and a plurality of subpixels having the first color located in a second column to the first operational amplifier, and couples a plurality of subpixels having a second color located in the first column and a plurality of subpixels having the second color located in the second column to the second operational amplifier.

17. The display driver circuit of claim 16, wherein the plurality of subpixels having the first color located in the first column are coupled to the multiplexer circuit through the first data line, and the plurality of subpixels having the second color located in the first column are coupled to the multiplexer circuit through a third data line.

18. The display driver circuit of claim 16, wherein one of the first color and the second color is red, and the other of the first color and the second color is blue.

19. The display driver circuit of claim 15, wherein the multiplexer circuit comprises:

a plurality of switches, each coupled between one of the first operational amplifier and the second operational amplifier and one of a plurality of data lines coupled to the plurality of columns of subpixels.

20. The display driver circuit of claim 1, further comprising:

a first digital-to-analog converter (DAC) coupled to the first operational amplifier; and a second DAC coupled to the second operational amplifier;

wherein the first DAC and the second DAC are coupled to a same gamma circuit.

21. The display driver circuit of claim 1, wherein the first operational amplifier is in a first chopper configuration when driving the first subpixel, and in a second chopper configuration when driving the second subpixel.

* * * * *